US012665947B2

(12) United States Patent (10) Patent No.: US 12,665,947 B2
Gong et al. (45) Date of Patent: Jun. 23, 2026

(54) DATA SYNCHRONIZATION METHOD, MEDIUM, PROGRAM PRODUCT, AND ELECTRONIC DEVICE

(71) Applicant: Huawei Technologies Co., Ltd., Shenzhen (CN)

(72) Inventors: Ashi Gong, Xi'an (CN); Wenhui Liu, Xi'an (CN); Youfu Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/910,416

(22) Filed: Oct. 9, 2024

(65) Prior Publication Data

US 2025/0039259 A1 Jan. 30, 2025

Related U.S. Application Data

(63) Continuation of application No. PCT/CN2023/089305, filed on Apr. 19, 2023.

(30) Foreign Application Priority Data

Apr. 22, 2022 (CN) .......................... 202210431213.4

(51) Int. Cl.
*G06F 15/16* (2006.01)
*H04L 67/1095* (2022.01)
*H04L 67/60* (2022.01)
(52) U.S. Cl.
CPC .......... *H04L 67/1095* (2013.01); *H04L 67/60* (2022.05)

(58) Field of Classification Search
CPC ...... H04L 67/1095; H04L 67/60; G06F 16/27
See application file for complete search history.

(56) References Cited

U.S. PATENT DOCUMENTS

| 11,089,352 B1 | 8/2021 | Bartholomew et al. | |
| 2015/0026123 A1* | 1/2015 | Krishnan | G06F 16/27 |
| | | | 707/610 |
| 2021/0250427 A1* | 8/2021 | Zhang | H04L 69/24 |

FOREIGN PATENT DOCUMENTS

| CN | 104301290 A | 1/2015 |
| CN | 108270852 A | 7/2018 |

* cited by examiner

*Primary Examiner* — John B Walsh
(74) *Attorney, Agent, or Firm* — Slater Matsil, LLP

(57) ABSTRACT

A first electronic device determines, in response to a data synchronization request, a first time required for sending first data requested by the data synchronization request to a second electronic device. The first electronic device adjusts the first data to second data in response to the first time being greater than a preset time threshold, where a data amount of the second data is less than a data amount of the first data. The first electronic device sends the second data to the second electronic device, where a second time required by the first electronic device to send the second data to the second electronic device is less than the preset time threshold.

20 Claims, 15 Drawing Sheets

100

200

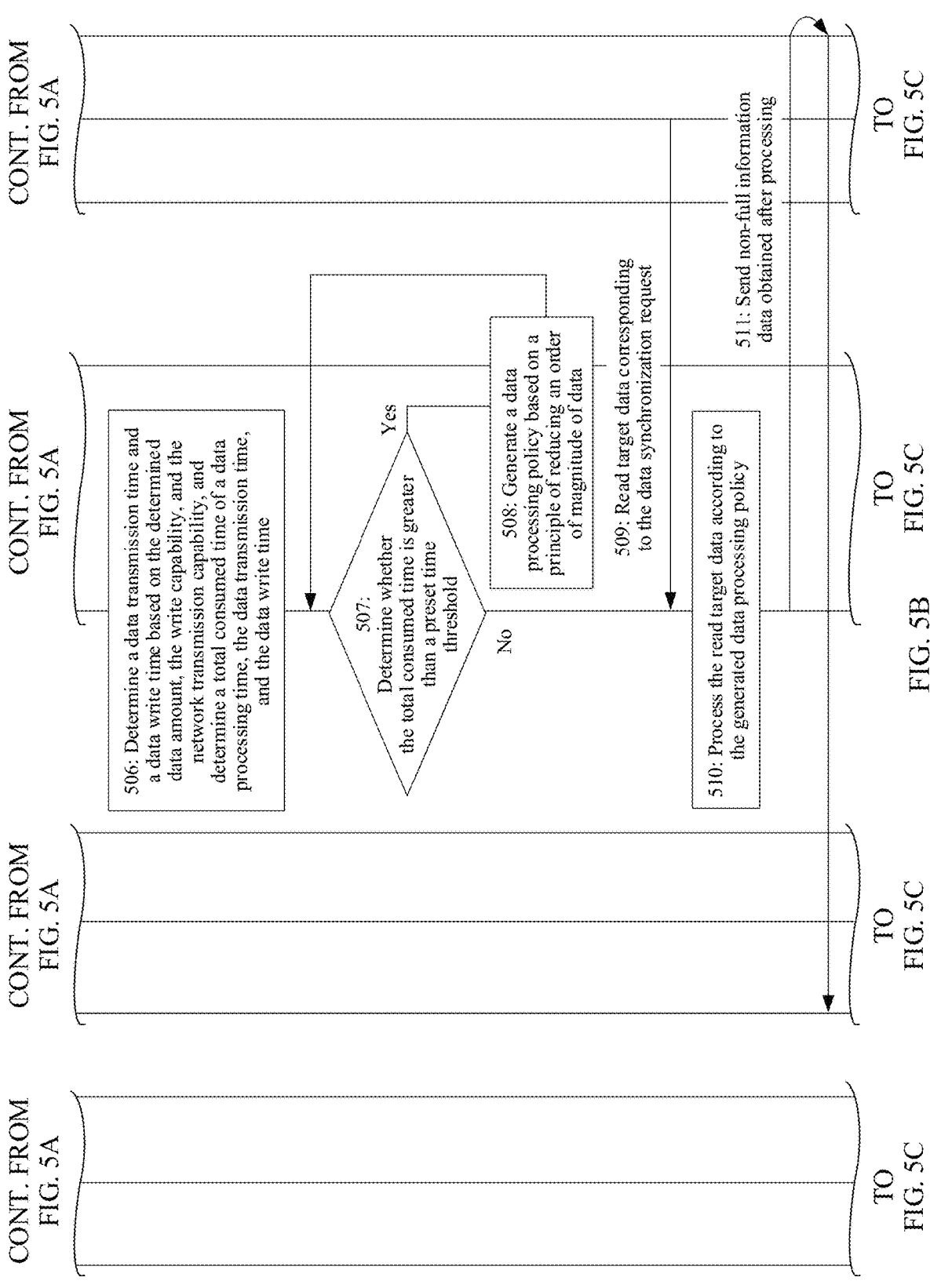

CONT. FROM FIG. 5A

CONT. FROM FIG. 5A

506: Determine a data transmission time and a data write time based on the determined data amount, the write capability, and the network transmission capability, and determine a total consumed time of a data processing time, the data transmission time, and the data write time 507: Determine whether the total consumed time is greater than a preset time threshold Yes No 508: Generate a data processing policy based on a principle of reducing an order of magnitude of data 509: Read target data corresponding to the data synchronization request 510: Process the read target data according to the generated data processing policy 511: Send non-full information data obtained after processing

CONT. FROM FIG. 5A

CONT. FROM FIG. 5A

Electronic device 100

DATA SYNCHRONIZATION METHOD, MEDIUM, PROGRAM PRODUCT, AND ELECTRONIC DEVICE

CROSS-REFERENCE TO RELATED APPLICATIONS

This application is a continuation of International Patent Application No. PCT/CN2023/089305, filed on Apr. 19, 2023, which claims priority to Chinese Patent Application No. 202210431213.4, filed on Apr. 22, 2022. The disclosures of the aforementioned applications are hereby incorporated by reference in their entireties.

TECHNICAL FIELD

This application relates to the field of internet technologies, and in particular, to a data synchronization method, a medium, a program product, and an electronic device.

BACKGROUND

With continuous development of mobile internet technologies, to implement effective sharing of information resources, a cross-device data synchronization technology is usually used to perform data synchronization. The cross-device data synchronization technology is a technology in which electronic devices can share information resources stored in the electronic devices. For example, a user views, on a tablet through a distributed gallery function, an album shared by a mobile phone.

In a cross-device data synchronization process, if the user taps on an electronic device of a data request end to view more detailed data information, the electronic device of the data request end sends a detailed data information request to an electronic device of a data source end in response to the operation of the user. The electronic device of the data source end responds to the detailed data information request, and then needs to perform a plurality of operations, such as data processing, data transmission, and data writing, so that detailed data information can be displayed on a display of the electronic device of the data request end for the user to browse. The foregoing operation process consumes a long time, and in a case of larger data transmission, consumes a longer time.

SUMMARY

Embodiments of this application provide a data synchronization method, a medium, a program product, and an electronic device.

According to a first aspect, an embodiment of this application provides a data synchronization method, applied to a first electronic device. The method may include: The first electronic device receives a data synchronization request sent by a second electronic device. The first electronic device determines, in response to the data synchronization request, a first time required for sending first data requested by the data synchronization request to the second electronic device. The first electronic device adjusts the first data to second data in response to the first time being greater than a preset time threshold, where a data amount of the second data is less than a data amount of the first data. The first electronic device sends the second data to the second electronic device, where a second time required by the first electronic device to send the second data to the second electronic device is less than the preset time threshold. It may be understood that the first time may be an estimated time and a total consumed time in the following embodiments. Based on the technical solutions of this application, the first electronic device may dynamically adjust previously transmitted data, and first send, to the second electronic device, the previously transmitted data to be displayed by the second electronic device, so that a user first views the previously transmitted data. Then, the first electronic device sends, to the second electronic device, some subsequently transmitted data or total data to be displayed by the second electronic device, thereby reducing the user's awareness of a time consumed in a data receiving process, improving continuity of the user's browsing data, and improving user experience.

In a possible implementation of the first aspect, the method further includes: After sending the second data to the second electronic device, the first electronic device sends the first data to be displayed by the second electronic device.

In a possible implementation of the first aspect, that the first electronic device adjusts the first data corresponding to the data synchronization request to second data includes: in response to the first data being a picture or a video with a preset resolution, obtaining the second data after reducing the preset resolution of the first data.

In a possible implementation of the first aspect, after sending the second data to the second electronic device, the first electronic device sends third data to be displayed by the second electronic device, where the first data is full data, and the third data is incremental data.

In a possible implementation of the first aspect, a type of the third data is different from a type of the second data.

In a possible implementation of the first aspect, the first time is calculated by using the following formula:

$$T = T_p + T_b + T_w$$

where $T_p$ represents a data processing time for the first electronic device to process the first data, $T_b$ represents a data transmission time required by the first electronic device to send the first data to the first electronic device, and $T_w$ represents a write time for the second electronic device to write the first data to the second electronic device.

According to a second aspect, an embodiment of this application provides a data synchronization method, applied to a second electronic device. The method includes: The second electronic device sends a data synchronization request to a first electronic device, where data requested by the data synchronization request is first data. The second electronic device receives second data sent by the first electronic device. A data amount of the second data is less than a data amount of the first data, a time required by the first electronic device to send the first data to the second electronic device is a first time, and a second time required by the first electronic device to send the second data to the second electronic device is less than the first time. Based on the technical solutions of this application, the second electronic device may first receive previously transmitted data sent by the first electronic device and display the previously transmitted data, so that the user first views the previously transmitted data. Then, the second electronic device receives some subsequently transmitted data or total data sent by the second electronic device, and displays the some subsequently transmitted data or total data, thereby reducing the user's awareness of a time consumed in a data receiving process, improving continuity of the user's browsing data, and improving user experience.

In a possible implementation of the second aspect, the method further includes: The second electronic device receives the first data sent by the first electronic device, and the second electronic device displays the first data. In this way, in a process in which the user browses display content on the second electronic device, the second electronic device synchronously refreshes page content, keeping the user from poor experience of data display freezing, and providing the user with smooth data display, thereby improving user experience.

In a possible implementation of the second aspect, the first data is a picture or a video with a preset resolution, and the second data is a picture or a video with a resolution lower than the preset resolution.

In a possible implementation of the second aspect, after receiving the second data sent by the first electronic device, the second electronic device receives third data sent by the first electronic device, and displays the third data, where the first data is full data, and the third data is incremental data. In this way, in a process in which the user browses display content on the second electronic device, the second electronic device synchronously refreshes page content, keeping the user from poor experience of data display freezing, and providing the user with smooth data display, thereby improving user experience.

In a possible implementation of the second aspect, a type of the third data is different from a type of the second data.

In a possible implementation of the second aspect, the first time is calculated by using the following formula:

$$T = T_p + T_b + T_w$$

where $T_p$ represents a data processing time for the first electronic device to process the first data, $T_b$ represents a data transmission time required by the first electronic device to send the first data to the first electronic device, and $T_w$ represents a write time for the second electronic device to write the first data to the second electronic device.

According to a third aspect, an embodiment of this application provides a computer-readable storage medium. The computer-readable storage medium stores instructions. When the instructions are executed on an electronic device, the electronic device is enabled to perform the data synchronization method according to any one of the implementations of the first aspect or the second aspect.

According to a fourth aspect, an embodiment of this application provides an electronic device, including: an internal memory, configured to store instructions executed by one or more processors of the electronic device; and the processor, as one of processors of the electronic device, configured to perform the data synchronization method according to any one of the implementations of the first aspect or the second aspect.

According to a fifth aspect, an embodiment of this application provides a computer program product, including a computer program/instructions. When the computer program/instructions are executed by a processor, the data synchronization method in any one of the implementations of the first aspect or the second aspect is implemented.

According to a sixth aspect, an embodiment of this application provides a data synchronization method. The method includes: A first electronic device receives a data synchronization request sent by a second electronic device.

The first electronic device determines, in response to the data synchronization request, an address book synchronization time required for sending an address book information entry requested by the data synchronization request to the second electronic device, where the address book information entry includes contact information and a contact profile picture, and the contact information includes a contact name and a mobile phone number. In response to a first time being greater than a preset time threshold, the first electronic device adjusts the address book information entry to the contact information. The first electronic device sends the contact information to the second electronic device. A contact information synchronization time required by the first electronic device to send the contact information to the second electronic device is less than the preset time threshold.

In a possible implementation of the sixth aspect, the first electronic device may be a watch or a band, and the second electronic device may be a mobile phone.

In a possible implementation of the sixth aspect, when the contact information in the address book information entry does not have a contact profile picture corresponding to the contact information, a default profile picture of the first electronic device may be transmitted or no default profile picture may be transmitted.

In a possible implementation of the sixth aspect, the data synchronization request may be a call synchronization request. For example, when the second electronic device receives a call request with another device or a contact, the second electronic device may synchronize the call request to the first electronic device. The user may directly view, on the first electronic device, a call request interface corresponding to the call request. The call request interface may include contact information corresponding to the another device or the contact.

In a possible implementation of the sixth aspect, the first electronic device may first display the contact information corresponding to the another device or the contact, and then display a contact profile picture corresponding to the another device or the contact.

According to a seventh aspect, an embodiment of this application provides a data synchronization method. The method includes: A first electronic device receives a data synchronization request sent by a second electronic device. The first electronic device determines, in response to the data synchronization request, a first time required for sending a picture or a video with a preset resolution requested by the data synchronization request to the second electronic device. In response to the first time being greater than a preset time threshold, the first electronic device adjusts the picture or the video with the preset resolution to a picture or a video with a resolution lower than the preset resolution. The first electronic device sends the picture or the video with a resolution lower than the preset resolution to the second electronic device. A second time required by the first electronic device to send the picture or the video with a resolution lower than the preset resolution to the second electronic device is less than the preset time threshold.

BRIEF DESCRIPTION OF THE DRAWINGS

FIG. 5A, FIG. 5B, and FIG. 5C are a schematic flowchart of a data synchronization method according to an embodiment of this application;

DETAILED DESCRIPTION OF ILLUSTRATIVE EMBODIMENTS

Illustrative embodiments of this application include but are not limited to a data synchronization method, a medium, a program product, and an electronic device.

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application.

In a cross-device data synchronization process, an entire operation process in which a data source end displays detailed data information on a display of a data request end consumes a long time, and a user may not be able to browse requested data in time, resulting in poor user experience.

Figure 1:
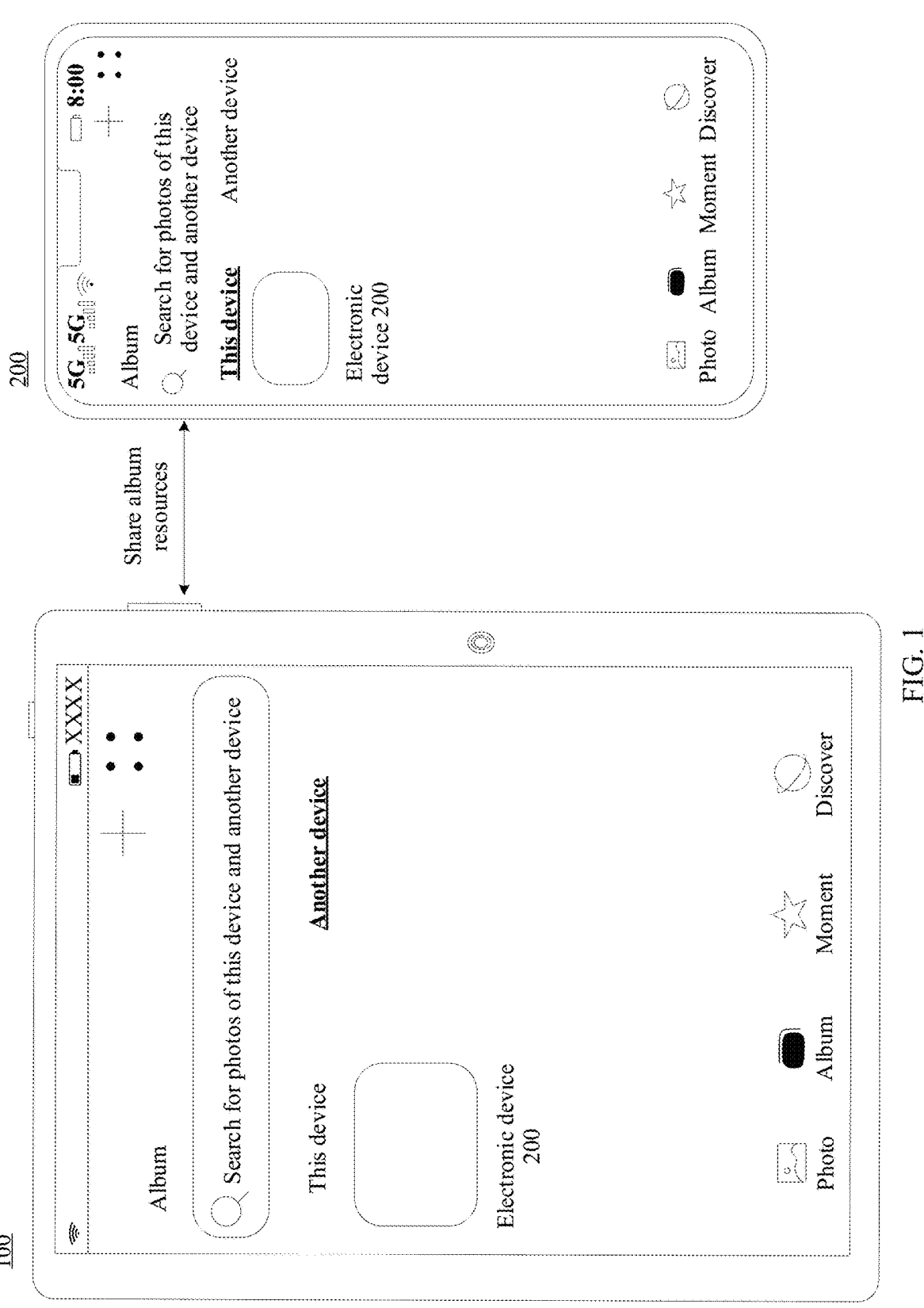
FIG. 1 is a diagram of an application scenario of a data synchronization method in a conventional technology.

For example, according to some embodiments of this application, FIG. 1 is a schematic of an application scenario of a data synchronization method by using an example in which a mobile phone and a tablet share an album. As shown in FIG. 1, the application scenario includes a tablet 100 and a mobile phone 200. After a hyper terminal system is formed between the tablet 100 and the mobile phone 200, an association relationship may be established between the tablet 100 and the mobile phone 200 to implement sharing of album resources stored by the tablet 100 and the mobile phone 200. Then, the user may view, in a gallery application on the tablet 100, an album shared by the mobile phone 200 by using a distributed gallery function (which may also be referred to as multi-device gallery browsing) in a hyper terminal.

Figure 2A:
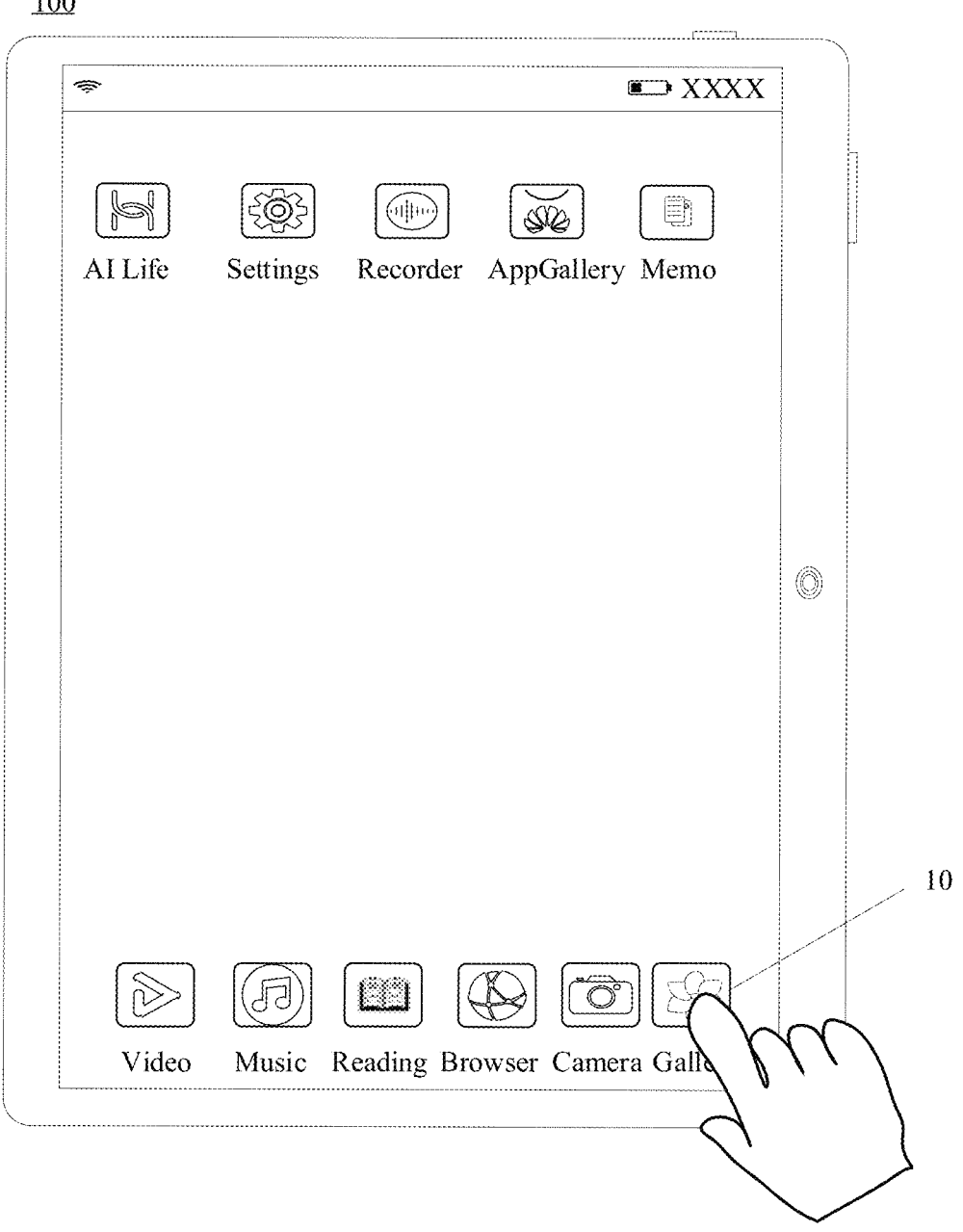
FIG. 2A to FIG. 2F are diagrams of interface changes when a user views, on a tablet by using a distributed gallery function, an album shared by a mobile phone in a conventional technology.
Figure 2B:
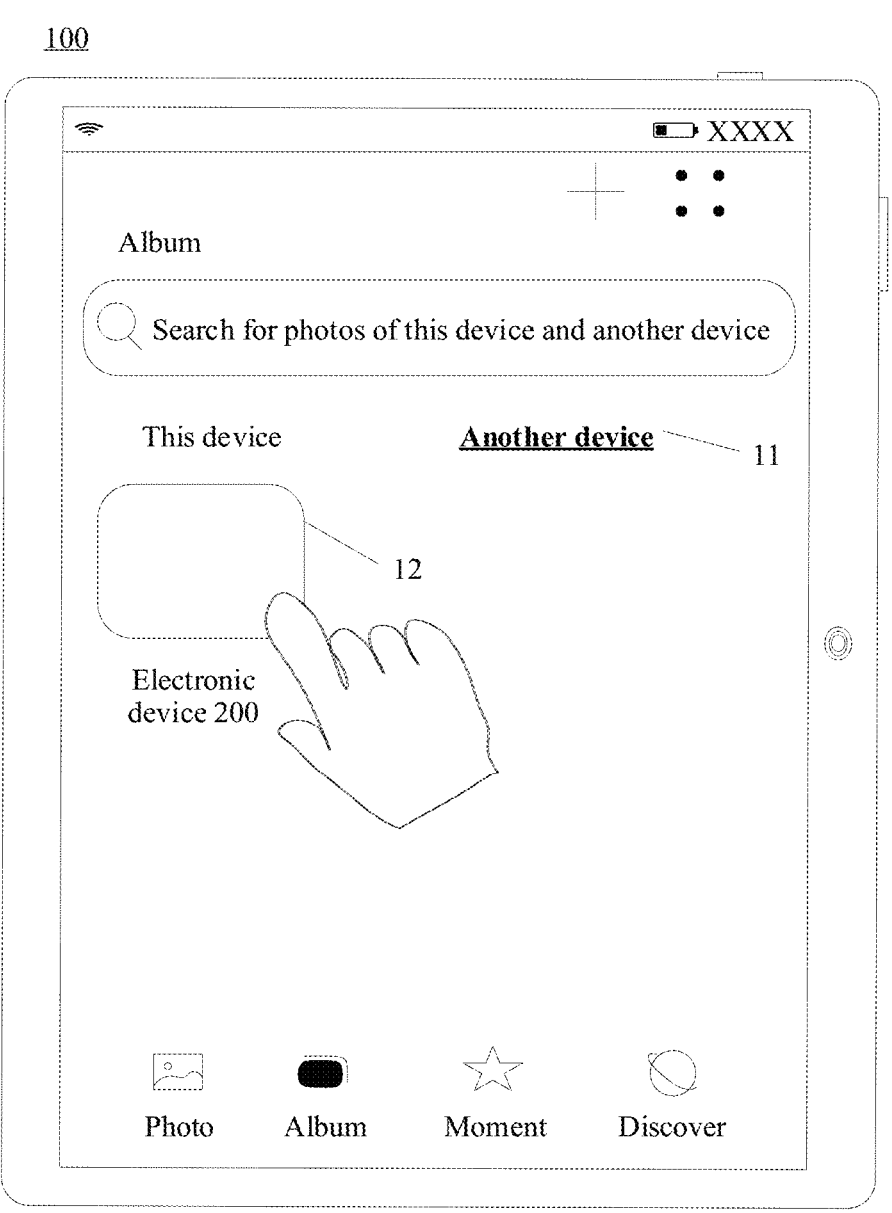
Figure 2C:
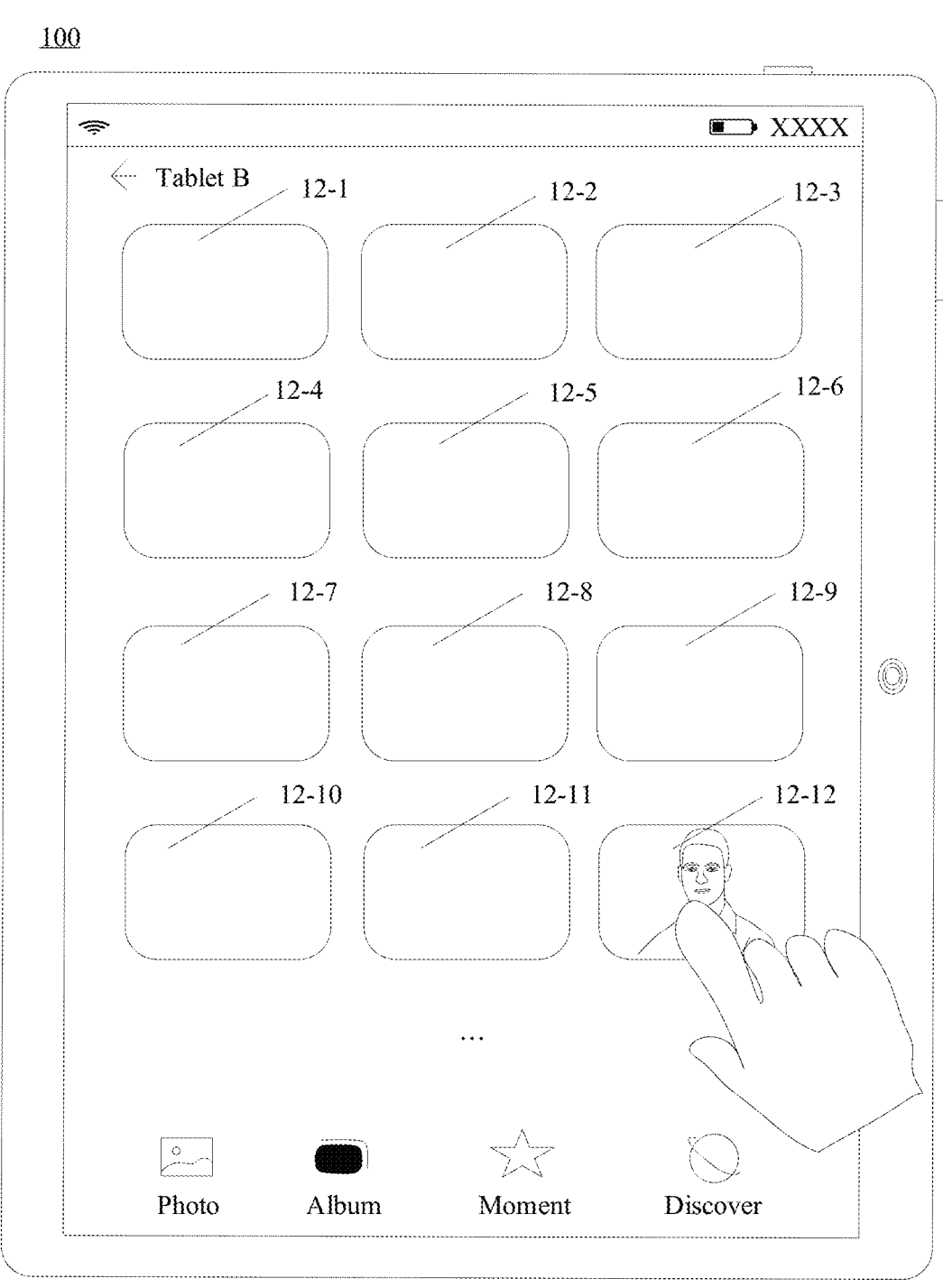
Figure 2D:
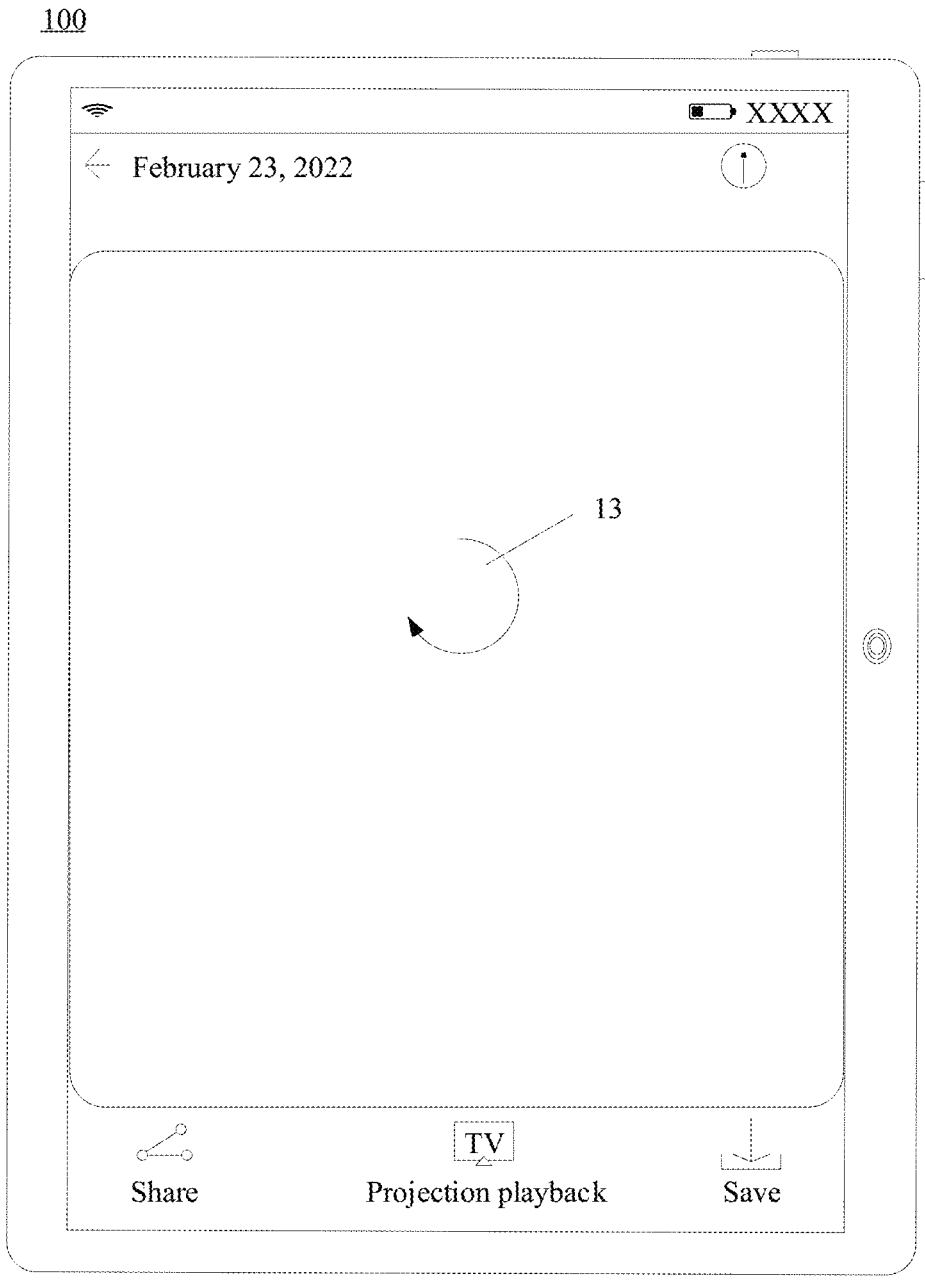

For example, according to some embodiments of this application, FIG. 2A to FIG. 2F are diagrams of interface changes when a user views, on a tablet 100 by using a distributed gallery function, an album shared by a mobile phone 200. As shown in FIG. 2A, the user first opens a gallery application 10 shown in FIG. 2A, and an album interface is displayed as shown in FIG. 2B. The album interface includes a local control and another device control 11. After the user taps the another device control 11, the tablet 100 displays an album 12 of the mobile phone 200, and the album 12 includes a plurality of pictures. In a case in which the user taps the album 12, the tablet 100 displays thumbnails of the plurality of pictures in the album 12. For example, FIG. 2C shows an example of thumbnails of pictures 12-1 to 12-12. In a case in which the user wants to view a large picture of a target picture 12-12, the user taps the picture 12-12. It should be understood that a thumbnail has a low resolution and a small size, while a large picture has a high resolution and a large size. Then, the tablet 100 sends a request for large picture data of the picture 12-12 to the mobile phone 200 in response to an operation of tapping the picture 12-12 by the user.

In response to the request, the mobile phone 200 decompresses a large picture source file of the picture 12-12, sends decompressed large picture data of the picture 12-12 to the tablet 100 through a network, and writes the decompressed large picture data of the picture 12-12 to the tablet 100. Then, an electronic device displays a large picture based on the decompressed large picture data of the picture 12-12. In a process in which large picture data of the picture 12-12 is not written to the tablet 100, the tablet 100 displays no picture and only a loading status indicated by a circling loading icon 13 shown in FIG. 2D in a specific time. The user cannot quickly view the large picture of the picture 12-12, resulting in poor user experience.

To resolve the foregoing technical problems, this application provides a data synchronization method. For ease of understanding, the following embodiments may be described by using two electronic devices as an example, where one electronic device is used as a data source end, and the other electronic device is used as a data request end. The method includes: When the data source end receives a data synchronization request sent by the data request end, the data source end determines an estimated time required for transmitting data corresponding to the data synchronization request to the data synchronization request end. The estimated time includes a processing time for processing target data corresponding to the data synchronization request by the data source end, a transmission time of the target data, and a time for writing the target data to the data synchronization request end by the data source end.

If the data source end determines that the estimated time is greater than a preset time threshold, the data source end obtains, based on a type of the target data, non-full information data corresponding to the target data, and first sends adjusted non-full information data to the data request end for display. The non-full information data is low-resolution data of the target data or some core data of the target data. Specifically, when the data type of the target data is a picture type or a video type, the non-full information data is low-quality-level data. When the data type of the target data is a combination of a plurality of types, the non-full information data is core data corresponding to the target data.

In some embodiments, the low-quality-level data is data that is consistent with display content of the target data but has a resolution inconsistent with that of the target data. The core data of the target data is data that is consistent with some display content of the target data, and the some display content is preset data that matches a core requirement of the user. For example, if the target data is contact information, and the contact information includes a contact name, a mobile phone number, and a profile picture, the preset data that matches the core requirement of the user may be the contact name and the mobile phone number.

When the non-full information data is low-quality-level data of the target data, after sending the low-quality-level data, the data source end sends the low-quality-level data to the data request end for display, then sends the target data, and sends the target data to the data request end for display.

When the non-full information data is some core data of the target data, after sending the some core data of the target data, the data source end sends the some core data of the target data to the data request end for display. Then, data other than the core data in the target data is sent to the data request end for display. The data other than the core data in the target data is incremental information data of the target data. For example, if the target data is contact information, and the contact information includes a contact name, a mobile phone number, and a profile picture, the preset data that matches the core requirement of the user may be the contact name and the mobile phone number, and the incremental information data is the profile picture.

Based on the foregoing solution, in some embodiments, in a case in which the estimated time is greater than the preset time threshold, the data request end may preferentially display the low-quality-level data of the target data. Then, the data request end obtains, from the data source end, target data corresponding to the data synchronization request, refreshes a display page based on final target data, and displays display content with high quality.

In some other embodiments, in a case in which the estimated time is greater than the preset time threshold, the data request end may preferentially display the some core data of the target data. Then, the data request end obtains incremental information data corresponding to the data synchronization request from the data source end, refreshes a display page based on final incremental information data, and displays remaining display content.

In this way, the data request end may send data to the data source end in a case in which the estimated time is less than the preset time threshold, thereby improving a data transmission rate to some extent and improving user experience. In addition, in a process in which the user browses display content on the data request end, the data request end synchronously refreshes page content, keeping the user from poor experience of data display freezing, and providing the user with smooth data display, thereby improving user experience.

The following describes the solution with reference to a specific scenario.

For example, as shown in FIG. 2C, the tablet 100 responds to an operation of tapping a thumbnail of the selected target picture 12-12 by the user, and then sends a request for large picture data of the selected target picture 12-12 to the mobile phone 200.

The mobile phone 200 determines through calculation that an estimated time for transmitting picture data with a preset resolution of the target picture 12-12 corresponding to the request from the mobile phone 200 to the tablet 100 is greater than the preset time threshold, and determines that a type of the target data is a picture. In this case, the mobile phone 200 adjusts the large picture data of the target picture 12-12 to picture data with a resolution lower than the preset resolution. In some embodiments, the picture data with a resolution lower than the preset resolution may be referred to as non-full information data.

The mobile phone 200 may first send picture data with a low resolution to the tablet 100. The tablet 100 may first display the target picture 12-12 with a resolution lower than the preset resolution, for example, a low-definition target picture 12-12 shown in FIG. 2F. It may be understood that a dashed line in FIG. 2F may represent low definition, but a display form of a low-definition picture is not limited. The mobile phone 200 then sends picture data with the preset resolution of the target picture 12-12 to the tablet 100. The tablet 100 refreshes a display page, and displays the target picture 12-12 with the preset resolution, for example, a high-definition target picture 12-12 shown in FIG. 2E.

Based on the foregoing solution, the tablet 100 may first present an unclear picture, and then synchronously refresh to display a clearer picture in a browsing process, thereby providing the user with smooth data display and improving user experience.

For another example, in a scenario in which contact information is synchronized between a mobile phone and a watch, after the mobile phone establishes an association relationship with the watch, the watch may batch synchronize contact information from the mobile phone. For example, a hyper terminal system may be formed between the watch and the mobile phone, and the watch 100 responds to an operation in which the user taps batch synchronizing contact information, and then sends a request for batch synchronizing contact information to the mobile phone.

In a scenario in which contact information is synchronized between the mobile phone and the watch, after the mobile phone establishes an association relationship with the watch, the watch may batch synchronize the contact information from the mobile phone. The watch determines through calculation that an estimated time for transmitting the contact information corresponding to the request from the mobile phone to the watch is greater than the preset time threshold, and determines that a type of the contact information is a data type such as a picture or a text. In this case, the watch adjusts the contact information to some core data. For example, if the contact information is 100 pieces of contact information, the 100 pieces of contact information include information such as names, mobile phone numbers, and profile pictures of 100 contacts. Core data may be the names and mobile phone numbers of the 100 contacts, and incremental information data is the profile pictures of the contacts. The mobile phone first sends data of the names and mobile phone numbers of the 100 contacts to the watch for display. Then, the mobile phone sends data of the profile pictures of the contacts in the contact information to the watch for display. For example, the incremental information data may be the profile pictures of the 100 contacts.

Based on the foregoing solution, the watch may first present, to the user, information required by the user, such as a name and a mobile phone number of a contact, and then present, to the user, additional information such as a profile picture of the contact, thereby providing the user with smooth batch data transmission and improving user experience.

It may be understood that the data request end may be a device such as a mobile phone, a tablet, a large screen, a personal computer (PC), a watch, augmented reality (AR), or virtual reality (VR). The data source end may also be a device such as a mobile phone, a tablet, a large screen, a watch, AR, or VR, but is not limited thereto.

An example in which the data request end is the tablet 100, the data source end is the mobile phone 200, and the application scenario is album synchronization is used below to describe embodiments of this application with reference to the accompanying drawings.

It may be understood that operating systems installed on the tablet 100 and the mobile phone 200 may use a layered architecture, an event-driven architecture, a microcore architecture, a microservice architecture, or a cloud architecture. The tablet 100 and the mobile phone 200 use operating systems of a layered architecture as an example for description, and this is not limited herein.

Figure 3A:
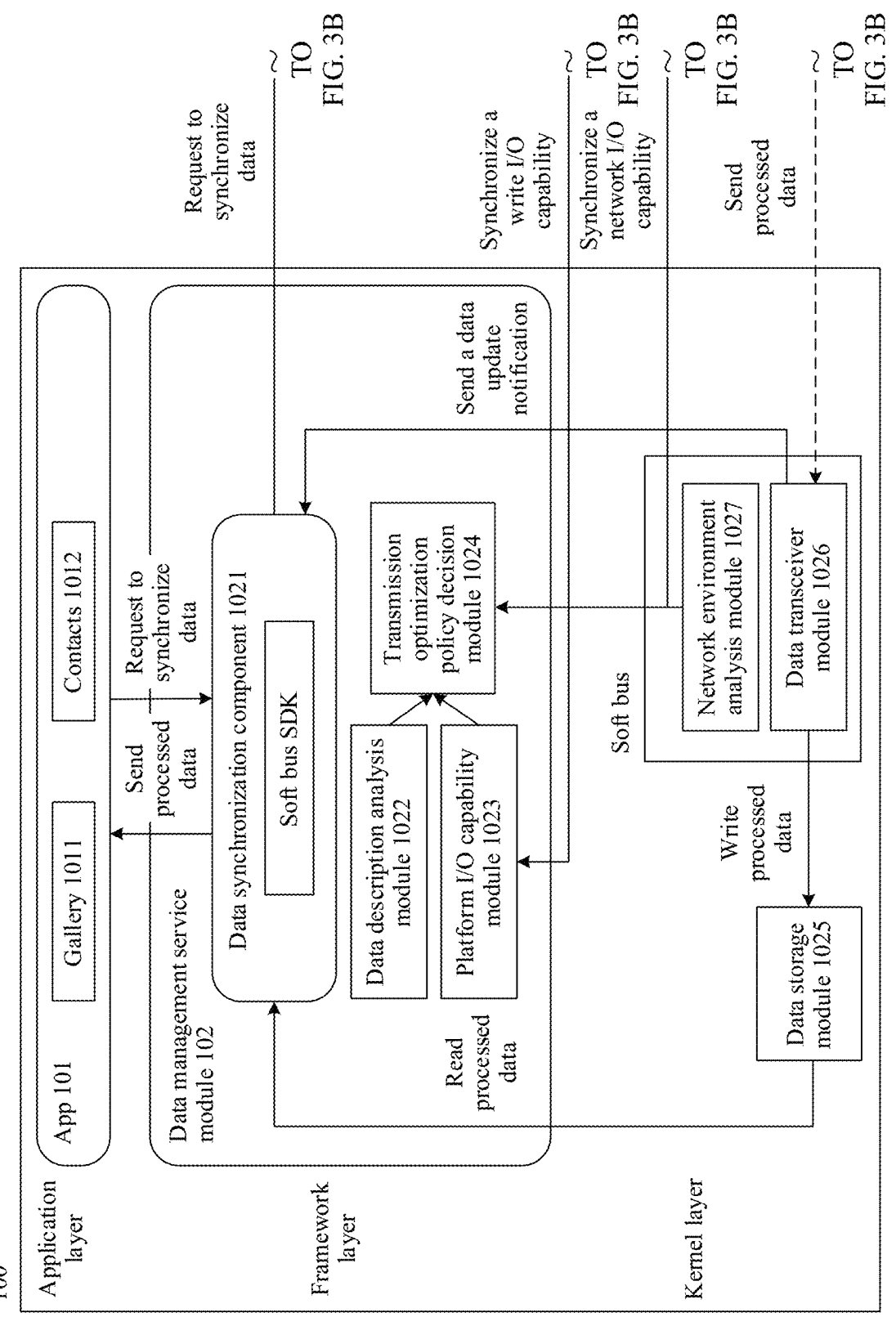
FIG. 3A and FIG. 3B are a diagram of software architectures of a tablet and a mobile phone according to an embodiment of this application.
Figure 3B:
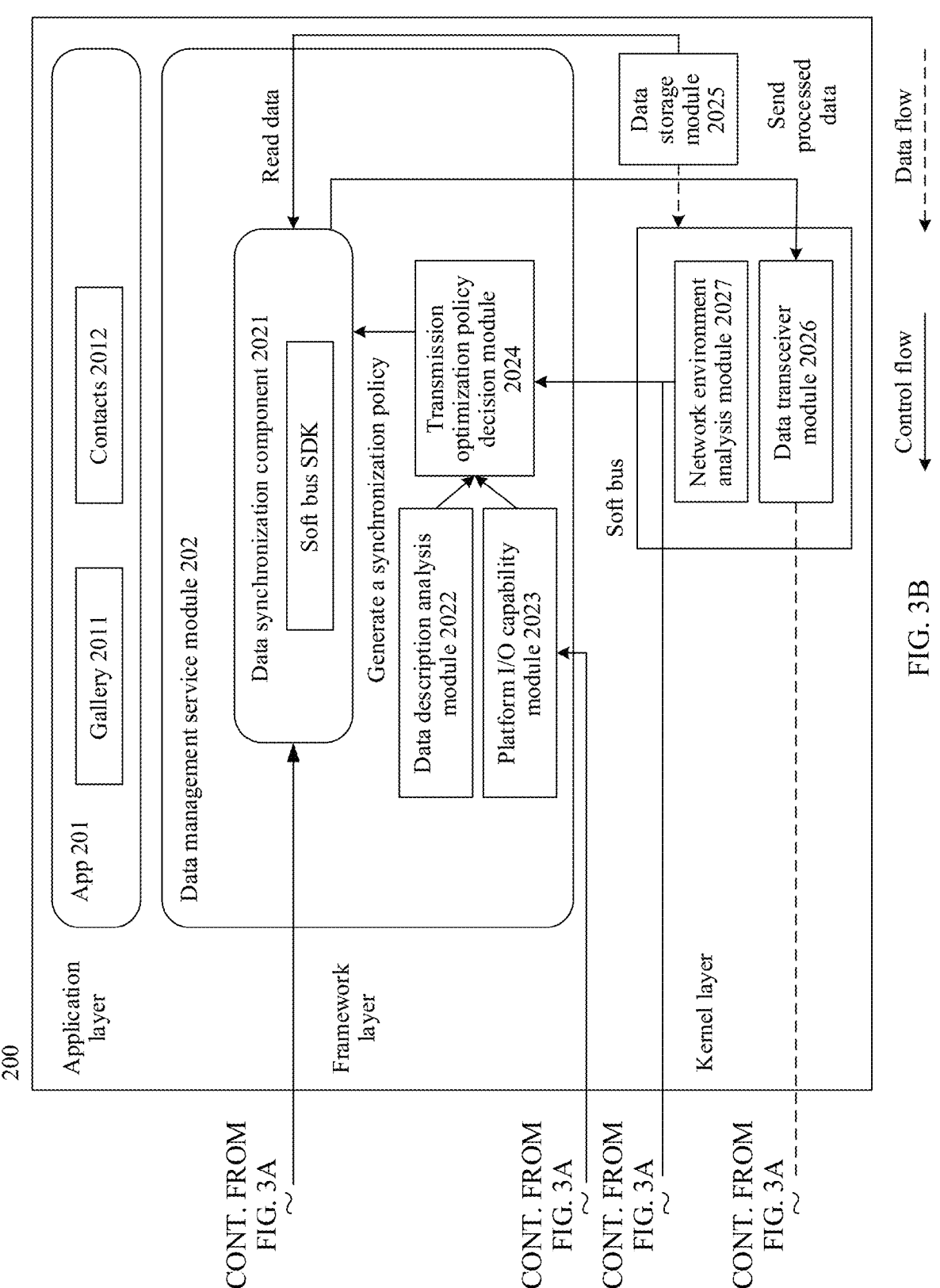

FIG. 3A and FIG. 3B are a diagram of software architectures of a tablet 100 and a mobile phone 200 that are applicable to this application according to some embodiments of this application. As shown in FIG. 3A and FIG. 3B, operating systems installed on the tablet 100 and the mobile phone 200 use a layered architecture. In the layered architecture, the operating system is divided into several layers, and each layer has a clear role and task. The layers communicate with each other through a software interface. In some embodiments, the operating system is divided into three layers: an application layer, a framework layer, and a kernel layer from top to bottom. In some other embodiments, the operating systems installed on the tablet 100 and the mobile phone 200 may also be divided into another quantity of hierarchical structures. This is not limited herein.

A hyper terminal system is formed between the tablet 100 and the mobile phone 200, and the tablet 100 and the mobile phone 200 are interconnected through an underlying network. The underlying network includes but is not limited to a distributed soft bus, wireless fidelity (Wi-Fi), a wireless local area network (WLAN), Bluetooth (BT), near field communication (NFC), and the like, which is not limited herein. In addition, the tablet 100 and the mobile phone 200 have succeeded in unified user authorization and authentication. That is, the tablet 100 and the mobile phone 200 are mutually trusted devices. For example, the tablet 100 and the mobile phone 200 may complete unified authorization and authentication by performing PIN code authentication, facial recognition authentication, fingerprint authentication, voice-print authentication, account password authentication, and the like by the user. This is not limited herein.

An application layer of the tablet 100 may include a series of applications (apps) 101 such as a system application, an extended application, or a third-party application. The system application includes Gallery 1011, Contacts 1012, Desktop, Settings, Camera, Wireless local area network, Bluetooth, Navigation, and the like. The extended application includes a software application developed by a third party such as a photographing application, a navigation application, and a music application. An application layer of the mobile phone 200 may include a series of applications 201 such as a system application, an extended application, or a third-party application. The system application includes Gallery 2011, Contacts 2012, Desktop, Settings, Camera, WLAN, Bluetooth, Navigation, and the like. The extended application includes a software application developed by a third party such as a photographing application, a navigation application, and a music application.

A framework layer of the tablet 100 may provide a multi-language framework for the application layer. The framework layer may include a data management service module 102. The data management service module 102 may include a data synchronization component 1021, a data description analysis module 1022, a platform read/write (Input/Output, I/O) capability module 1023, and a transmission optimization policy decision module 1024. A framework layer of the mobile phone 200 may also provide a multi-language framework for the application layer. The framework layer may also include a data management service module 202. The data management service module 202 may include a data synchronization component 2021, a data description analysis module 2022, a platform read/write I/O capability module 2023, and a transmission optimization policy decision module 2024. The data synchronization component 2021, the data description analysis module 2022, the platform I/O capability module 2023, and the transmission optimization policy decision module 2024 in the data management service module 202 have the same or basically the same functions as the data synchronization component 1021, the data description analysis module 1022, the platform I/O capability module 1023, and the transmission optimization policy decision module 1024 in the data management service module 102.

In some embodiments, the data synchronization component 1021 may exchange an instruction and share information with the data synchronization component 2021 by using a soft bus at a system service layer. It may be understood that the tablet 100 and the mobile phone 200 may implement data sharing by using a soft bus technology. The soft bus may enable instant interconnection between the tablet 100 and the mobile phone 200 in a same local area network or by using a Bluetooth connection. The soft bus may further enable the tablet 100 and the mobile phone 200 to share a file between heterogeneous networks such as Bluetooth and Wi-Fi. For example, one electronic device may receive a file by using Bluetooth, and the other electronic device may transmit a file by using Wi-Fi.

In this embodiment of this application, the tablet 100 may send a data synchronization request to the data synchronization component 2021 of the mobile phone 200 by using the data synchronization component 1021, and the mobile phone 200 may feed back target data corresponding to the data synchronization request and/or adjusted target data to the data synchronization component 1021 by using the data synchronization component 2021.

In some embodiments, the data description analysis module 1022 is configured to classify data descriptions in the data synchronization request based on the data synchronization request. Different data descriptions correspond to different data processing complexity and time overheads, thereby obtaining a data amount of the target data corresponding to the data synchronization request and a time for processing the target data.

It may be understood that the data description may be attribute information of data. For example, if the data is a picture, the data description may be a resolution of the picture. If the data is a picture and a text, the data description may be a resolution of the picture, a font of the text, or the like.

After obtaining the data amount of the target data corresponding to the data synchronization request and the time for processing the target data, the data description analysis module 1022 provides the transmission optimization policy decision module 1024 with the data amount of the target data corresponding to the data synchronization request and the time for processing the target data.

The platform I/O capability module 1023 is configured to locally store a read/write performance indicator. After a hyper terminal system is formed between the tablet 100 and the mobile phone 200, the platform I/O capability module 1023 and the platform I/O capability module 2023 may exchange write capability data. A write capability may include a speed at which the mobile phone 200 writes data to the tablet 100, and the speed may be measured in milliseconds per megabit, which is not limited herein.

A kernel layer of the tablet 100 may be a layer between hardware and software. The kernel layer may include a data storage module 1025, a data transceiver module 1026, and a network environment analysis module 1027. A kernel layer of the mobile phone 200 is a layer between hardware and software. The kernel layer includes a data storage module 2025, a data transceiver module 2026, and a network environment analysis module 2027. The data storage module 2025, the data transceiver module 2026, and the network environment analysis module 2027 have the same functions as the data storage module 1025, the data transceiver module 1026, and the network environment analysis module 1027.

In some embodiments, the network environment analysis module 1027 is configured to store available network bandwidth or a network transmission capability of the tablet 100. The network transmission capability may be a network data transmission speed measured in milliseconds per megabit, which is not limited herein.

After a hyper terminal system is formed between the tablet 100 and the mobile phone 200, the network environment analysis module 1027 and the network environment analysis module 2027 may synchronize network transmission capability data. The network environment analysis module 1027 is configured to provide the transmission optimization policy decision module 1024 with a network transmission capability. In some embodiments, the network environment analysis module 1027 and the network environment analysis module 2027 may share network transmission capability data of respective devices by using the soft bus technology.

Data sharing may be implemented between the data transceiver module 1026 and the data transceiver module 2026 by using the soft bus technology. In this embodiment of this application, the data transceiver module 1026 and the data transceiver module 2026 may share the target data corresponding to the data synchronization request by using the soft bus technology.

The transmission optimization policy decision module 1024 is configured to generate a data transmission policy. In this embodiment of this application, if the tablet 100 serves as the data request end to send the data synchronization request to the mobile phone 200, the transmission optimization policy decision module 2024 in the mobile phone 200 calculates a data processing time of the target data, a data transmission time, a write time for writing to the tablet 100, and a total estimated time of the data processing time, the data transmission time, and the write time of writing to the tablet 100 based on the data amount of the target data corresponding to the data synchronization request and a time for processing the target data provided by the data description analysis module 2022, a write capability of the tablet 100 provided by the platform I/O capability module, and a network transmission capability provided by the network environment analysis module 2027. If determining that the estimated time is greater than the preset time threshold, the mobile phone 200 adjusts target data finally sent to the mobile phone 200 to low-quality-level data. If an estimated time corresponding to adjusted target data is less than or equal to the preset time threshold, the mobile phone 200 first sends the adjusted target data to the tablet 100 for display, and then sends the target data or incremental information of the target data to the mobile phone 200 to refresh a data display page, thereby displaying display content corresponding to the target data.

Figure 4:
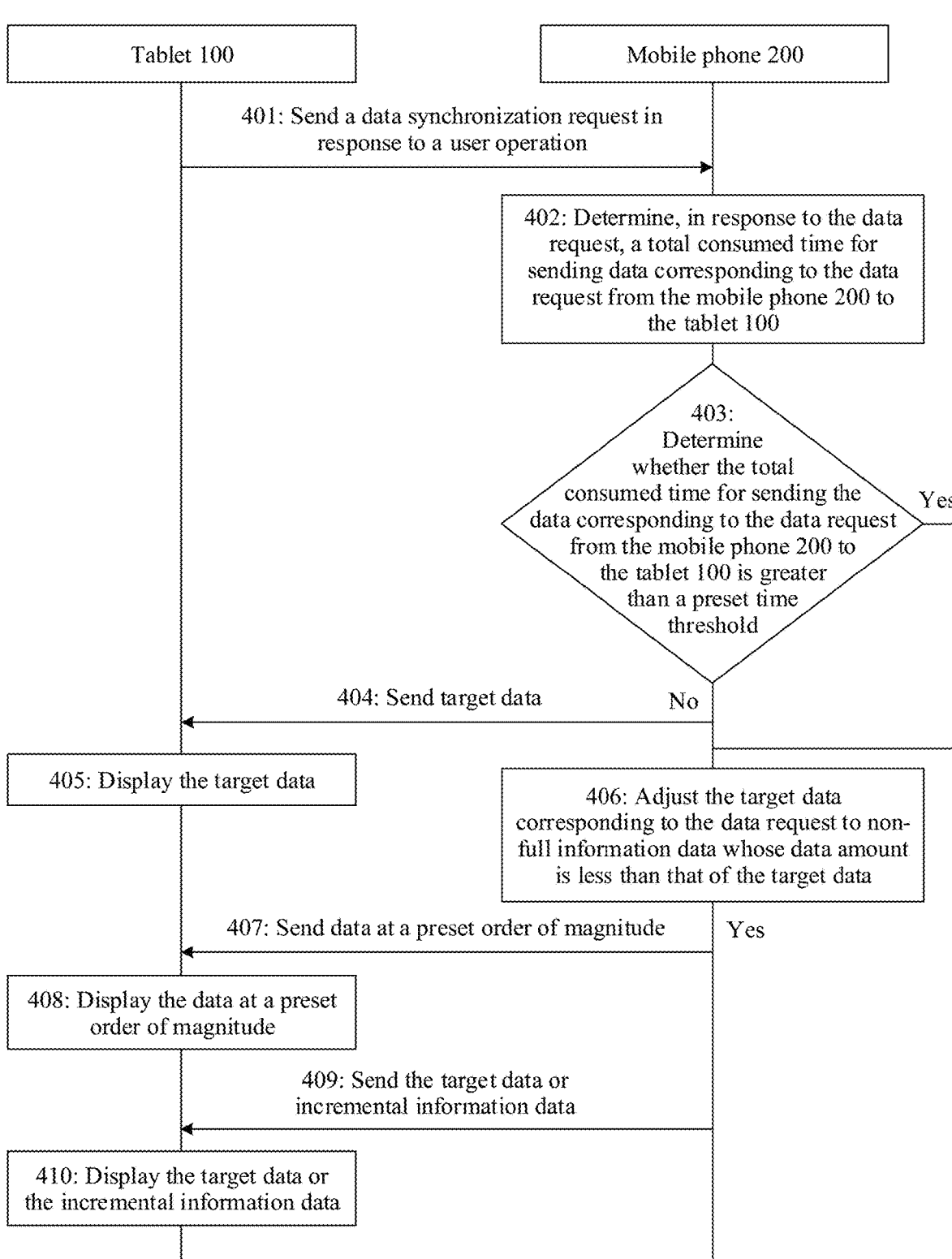
FIG. 4 is a schematic flowchart of a data synchronization method according to an embodiment of this application.

FIG. 4 is a schematic flowchart of a data synchronization method according to some embodiments of this application. As shown in FIG. 4, the procedure includes the following steps.

401: The tablet 100 sends a data request to the mobile phone 200 in response to a user operation.

Refer to FIG. 3A and FIG. 3B. An app 101 sends, in response to an operation of the user, a data synchronization request to the data description analysis module 2022 successively through the data synchronization component 1021 and the data synchronization component 2021.

For example, as shown in FIG. 2C, the tablet 100 responds to an operation of tapping a thumbnail of the selected target picture 12-12 by the user, and then sends a request for large picture data of the selected target picture 12-12 to the mobile phone 200 in response to the operation. In some other embodiments, in some voice interaction scenarios or gesture interaction scenarios, the user may trigger, by using a preset voice instruction (for example, a "request data synchronization" voice) or a gesture instruction (for example, shaking the mobile phone 200 for five consecutive seconds), the tablet 100 to send a request for large picture data of the selected target picture 12-12 to the mobile phone 200.

402: The mobile phone 200 determines, in response to the data request, a total consumed time for sending data corresponding to the data request from the mobile phone 200 to the tablet 100.

It may be understood that the mobile phone 200 determines a data transmission time and a data write time based on a data amount, a write capability, and a network transmission capability that are determined by the data request, and determines a total consumed time of a data processing time, the data transmission time, and the data write time.

For example, data processing means processing such as decompression on the data corresponding to the data request of the mobile phone 200, data transmission means a process in which the mobile phone 200 sends the data corresponding to the data request to the tablet 100, and data writing means a process in which the tablet 100 writes the data to a memory of the tablet 100 after receiving the data corresponding to the data request.

It may be understood that the total consumed time T is a time consumed by the mobile phone 200 to transmit the data corresponding to the data synchronization request to the mobile phone 200.

The total time consumed T may be calculated by using the following formula:

$$T = T_p + T_b + T_w$$

where $T_p$ represents the data processing time, $T_b$ represents the data transmission time, and $T_w$ represents the data write time.

In some embodiments, the data write time $T_w$ may be obtained by multiplying the write capability by a target data amount. If the write capability is represented by a symbol W, and the target data amount is represented by a symbol S, the data write time $T_w$ may be obtained by using the following formula:

$$T_w = W * S$$

The write capability W may be measured in milliseconds per megabyte (ms/MB), and the target data amount S may be measured in megabytes (MB), which is not limited herein.

A relationship between the data write time $T_w$, the write capability, and the target data amount is not limited to a linear relationship in the foregoing formula. In some other embodiments, in a test phase, the data write time $T_w$, the write capability, and the target data amount may be fitted based on a specific amount of test data of the data write time $T_w$, the write capability, and the target data amount, to obtain a fitting formula between the data write time $T_w$, the write capability, and the target data amount, and the fitting formula is configured in the platform I/O capability module 2023. In this way, in a case in which the write time is required, the mobile phone 200 may obtain a write time corresponding to the data synchronization request based on a data amount of the target data obtained from the data description analysis module 2022 and a write time data model of the mobile phone 200 obtained from the platform I/O capability module 2023.

In some embodiments, the data transmission time $T_b$ may be obtained by multiplying an I/O capability by the target data amount. If the write capability is represented by a symbol B, and the target data amount is represented by a symbol S, the data transmission time $T_b$ may be obtained by using the following formula:

$$T_b = B * S$$

The I/O capability B may be measured in milliseconds per megabyte (ms/MB), and the target data amount S may be measured in megabytes (MB), which is not limited herein.

Figure 6:
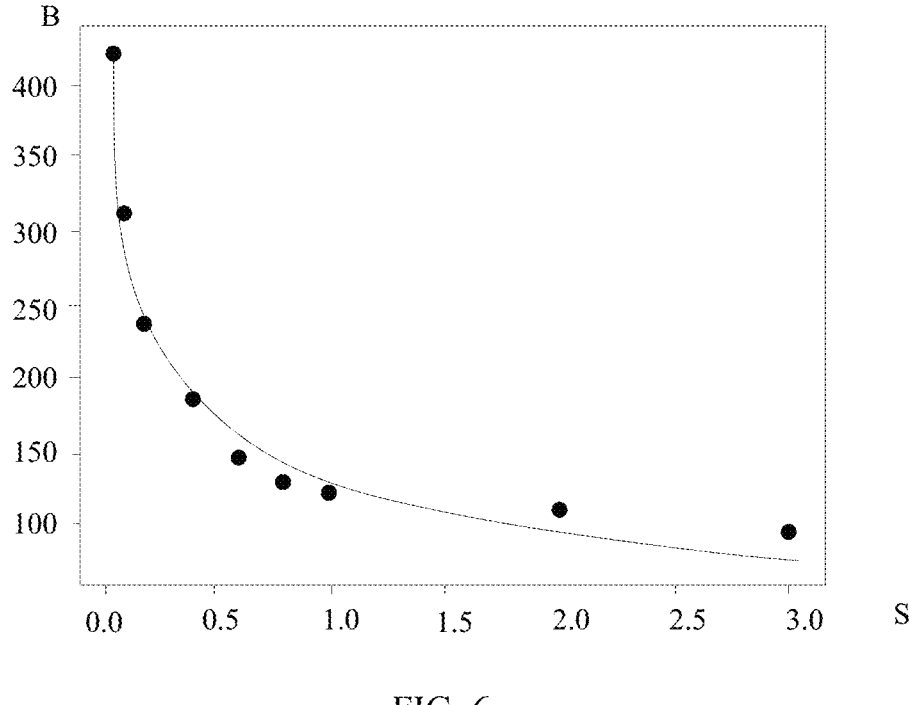
FIG. 6 shows a fitting curve of an I/O capability according to an embodiment of this application.

In some embodiments, the I/O capability B may be obtained in the following manner: A curve is drawn based on a large amount of test data of the target data amount and the I/O capability, and fitting is performed based on the curve, to obtain a corresponding data model (formula) for the I/O capability B. FIG. 6 shows a fitting curve of an I/O capability according to an embodiment of this application. As shown in FIG. 6, the abscissa in FIG. 6 represents the target data amount, and the ordinate represents the I/O capability B. The data model for the I/O capability may be calculated as follows:

$$B = \phi * \log(S + c) + \Delta_B$$

B represents the I/O capability, S represents the target data amount, the target data amount S may be measured in megabytes (MB), and $\phi$, c, and $\Delta_B$ are all constants, which are not limited herein.

It may be understood that, in a case in which the tablet 100 and the mobile phone 200 are networked, the data model for the I/O capability may be shared by the network environment analysis module 1027 and the network environment analysis module 2027 to obtain a data model for an I/O capability of each other. In this way, in a case in which the data transmission time needs to be calculated, the mobile phone 200 may obtain a data transmission time corresponding to the data synchronization request based on the data amount of the target data obtained from the data description analysis module 2022, and the data model for the I/O capability of the tablet 100 obtained from the network environment analysis module 2027.

It may be understood that, in a case in which the tablet 100 and the mobile phone 200 are networked, the data model for the I/O capability may be shared by the network environment analysis module 1027 and the network environment analysis module 2027 to obtain a data model for an I/O capability of each other. In this way, in a case in which the data transmission time needs to be calculated, the mobile phone 200 may obtain a data transmission time corresponding to the data synchronization request based on the data amount of the target data obtained from the data description analysis module 2022, and the data model for the I/O capability of the tablet 100 obtained from the network environment analysis module 2027.

403: The mobile phone 200 determines whether the total consumed time for sending the data corresponding to the data request from the mobile phone 200 to the tablet 100 is greater than the preset time threshold.

In some embodiments, if the total consumed time is greater than the preset time threshold, the method proceeds to step 406. If the total consumed time is not greater than the preset time threshold, the method proceeds to step 404.

It may be understood that the preset time threshold may be determined based on an actual situation. For example, the preset time threshold may be determined based on a basic time obtained from a human factors engineering experiment that conforms to user experience. The preset time threshold may be within a range less than or equal to the preset time threshold. For example, the preset time threshold may be 700 milliseconds, 600 milliseconds, 500 milliseconds, 400 milliseconds, 300 milliseconds, 200 milliseconds, or 100 milliseconds.

404: The mobile phone 200 sends the target data to the tablet 100.

405: The tablet 100 displays the target data.

Figure 2E:
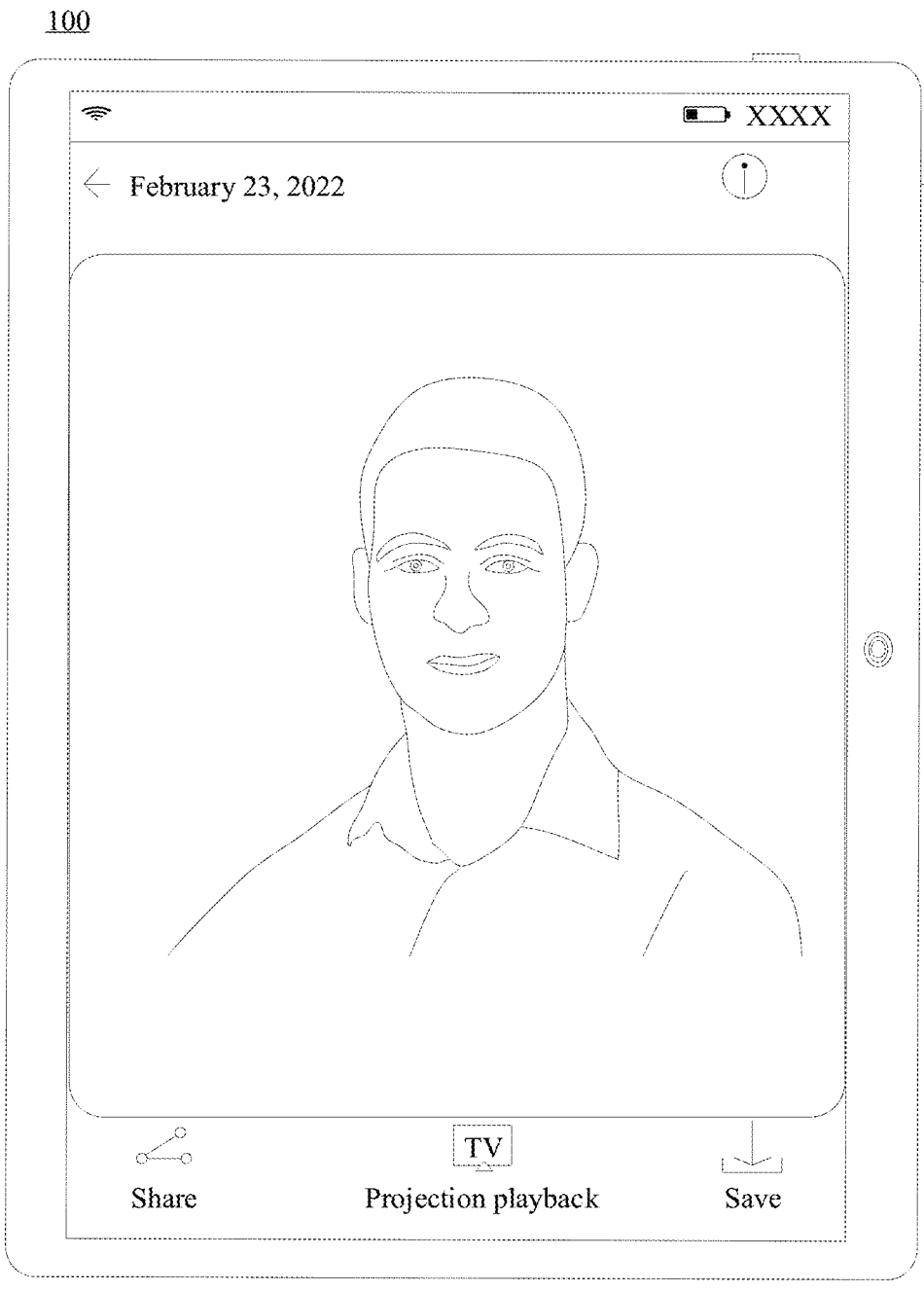

In some embodiments, the tablet 100 refreshes a data display page based on picture data with the preset resolution, and displays a picture with the preset resolution. For example, as shown in FIG. 2E, the tablet 100 refreshes the display page, and displays a large picture of the target picture 12-12.

It may be understood that, based on the foregoing solution, this application can determine different data processing policies required for cross-device synchronization of data, based on different network environments, different data amounts, and read/write and processing capabilities of different electronic devices on the premise of data transmission efficiency. Through construction of a dynamic data processing and transmission policy and comprehensive consideration of the foregoing factors, better collaboration of network transmission, data processing, and data writing is implemented, thereby improving user experience.

406: The mobile phone 200 adjusts the target data corresponding to the data request to non-full information data whose data amount is less than that of the target data.

It may be understood that, if the total consumed time is greater than the preset time threshold, it indicates that a time for transmitting data from the tablet 100 to the mobile phone 200 makes the user experience unsmooth display. Therefore, the transmission optimization policy decision module 2024 is required to generate a data processing policy based on a principle of reducing an order of magnitude of data, to reduce a data amount of transmitted data, thereby reducing a transmission delay.

It may be understood that a larger amount of data to be transmitted indicates a larger data transmission time and a larger write time, and a longer delay in transmitting the data from the tablet 100 to the mobile phone 200. Therefore, a delay in transmitting the data from the tablet 100 to the mobile phone 200 may be reduced by reducing an order of magnitude of the target data.

Table 1 is an example table of the data amount, the data processing time, the data transmission time, and the write time that are calculated in a test phase.

TABLE 1

| | Data amount (MB) | | | | | | | | | |
|---|---|---|---|---|---|---|---|---|---|---|
| | 0.05 | 0.1 | 0.2 | 0.4 | 0.6 | 0.8 | 1 | 2 | 3 | 4 |
| Data processing time (ms) | 14 | 26 | 37 | 50 | 65 | 77 | 95 | 108 | 132 | 166 |
| Data transmission time (ms) | 26 | 35 | 47 | 74 | 88 | 102 | 117 | 148 | 175 | 203 |

TABLE 1-continued

| | Data amount (MB) | | | | | | | | | |
|---|---|---|---|---|---|---|---|---|---|---|
| | 0.05 | 0.1 | 0.2 | 0.4 | 0.6 | 0.8 | 1 | 2 | 3 | 4 |
| Write time (ms) | 3 | 4 | 6 | 10 | 15 | 19 | 22 | 46 | 66 | 80 |

Based on Table 1, a larger amount of data to be transmitted indicates a larger data transmission time and a larger write time, and a longer delay in transmitting the data from the tablet 100 to the mobile phone 200. For embodiments provided in this application, a delay in transmitting the data from the tablet 100 to the mobile phone 200 may be reduced by reducing an order of magnitude of the target data.

In some embodiments, if a data type of requested data corresponding to the data synchronization request is a picture, the mobile phone 200 may adjust picture data with the preset resolution to picture data with a resolution lower than the preset resolution, to adjust the target data finally sent to the tablet 100 to non-full information data. For example, as shown in FIG. 2C, the mobile phone 200 determines through calculation that an estimated time for transmitting large picture data of the target picture 12-12 corresponding to the request from the mobile phone 200 to the tablet 100 is greater than the preset time threshold. In this case, the mobile phone 200 adjusts the large picture data of the target picture 12-12 to picture data with a low resolution.

407: The mobile phone 200 sends the non-full information data to the tablet 100.

408: The tablet 100 displays the non-full information data.

Figure 2F:
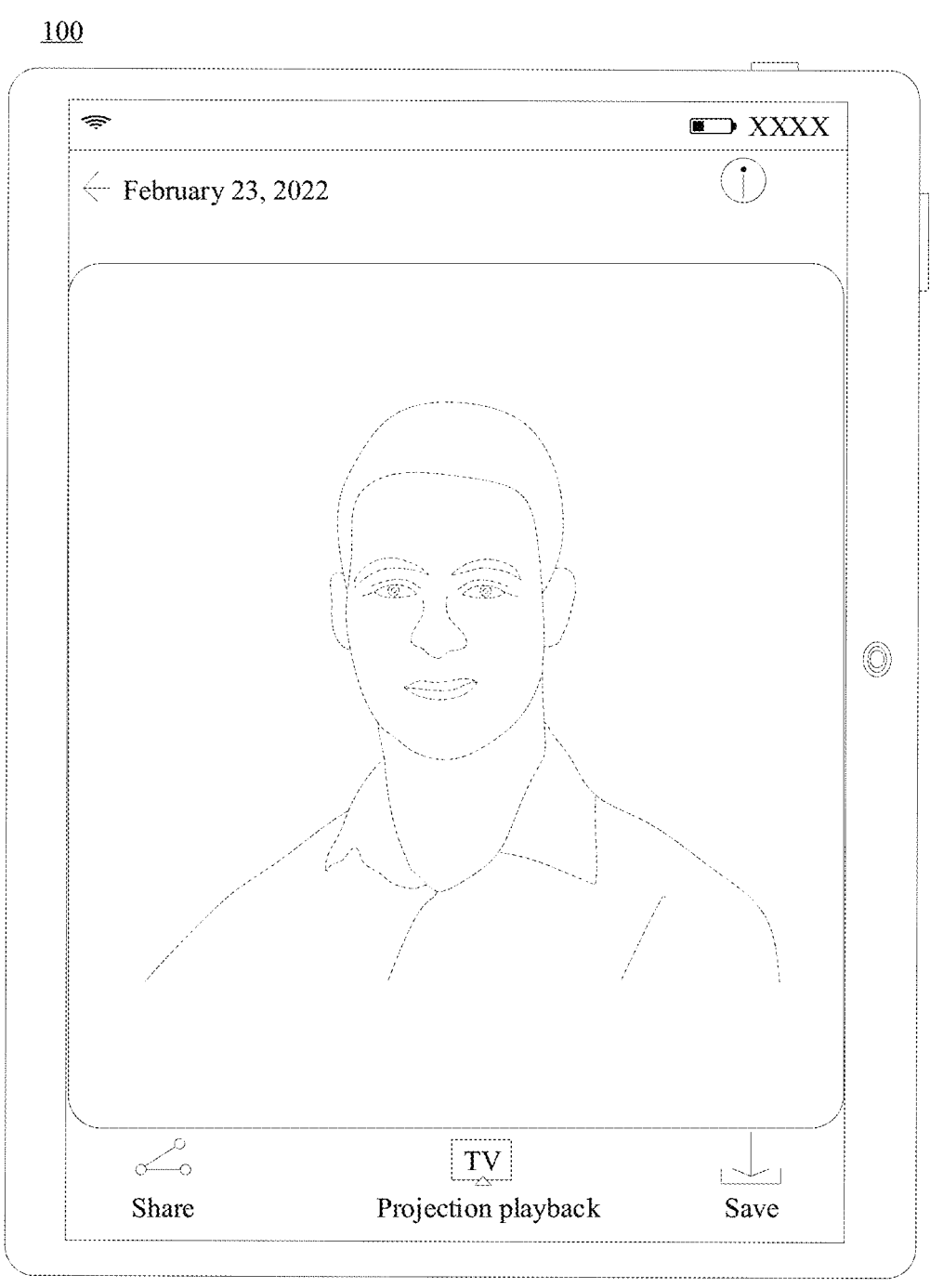

It may be understood that, in some embodiments, if the data type of the requested data corresponding to the data synchronization request is a picture, the tablet 100 may first display a low-definition picture based on the picture data with a low resolution. For example, as shown in FIG. 2F, the tablet 100 first displays a low-definition target picture 12-12 based on picture data with a low resolution.

409: The mobile phone 200 sends the target data or incremental information data to the tablet 100.

When the non-full information data is low-quality-level data of the target data, after sending the low-quality-level data, the mobile phone 200 sends the low-quality-level data to the tablet 100 for display, and then sends the target data.

When the non-full information data is some core data of the target data, after sending the some core data of the target data, the mobile phone 200 sends the some core data of the target data to the tablet 100 for display. Then, data other than the core data in the target data (incremental information data of the target data for short) is sent.

410: The tablet 200 displays the target data or the incremental information data.

It may be understood that, in some embodiments, the tablet 100 refreshes a data display page based on picture data with the preset resolution, and displays a picture with the preset resolution. For example, as shown in FIG. 2E, the tablet 100 refreshes the display page, and displays a large picture of the target picture 12-12.

It may be understood that, based on the foregoing solution, this application can determine different data processing policies required for cross-device synchronization of data, based on different network environments, different data amounts, and read/write and processing capabilities of different electronic devices on the premise of human factors engineering and user experience. Through construction of a dynamic data processing and transmission policy and comprehensive consideration of the foregoing factors, better collaboration of network transmission, data processing, and data writing is implemented, thereby improving user experience.

Based on the operating systems shown in FIG. 3A and FIG. 3B, the following further describes the technical solutions of this application in detail with reference to the accompanying drawings and the schematic flowchart of the data synchronization method.

Figure 5A:
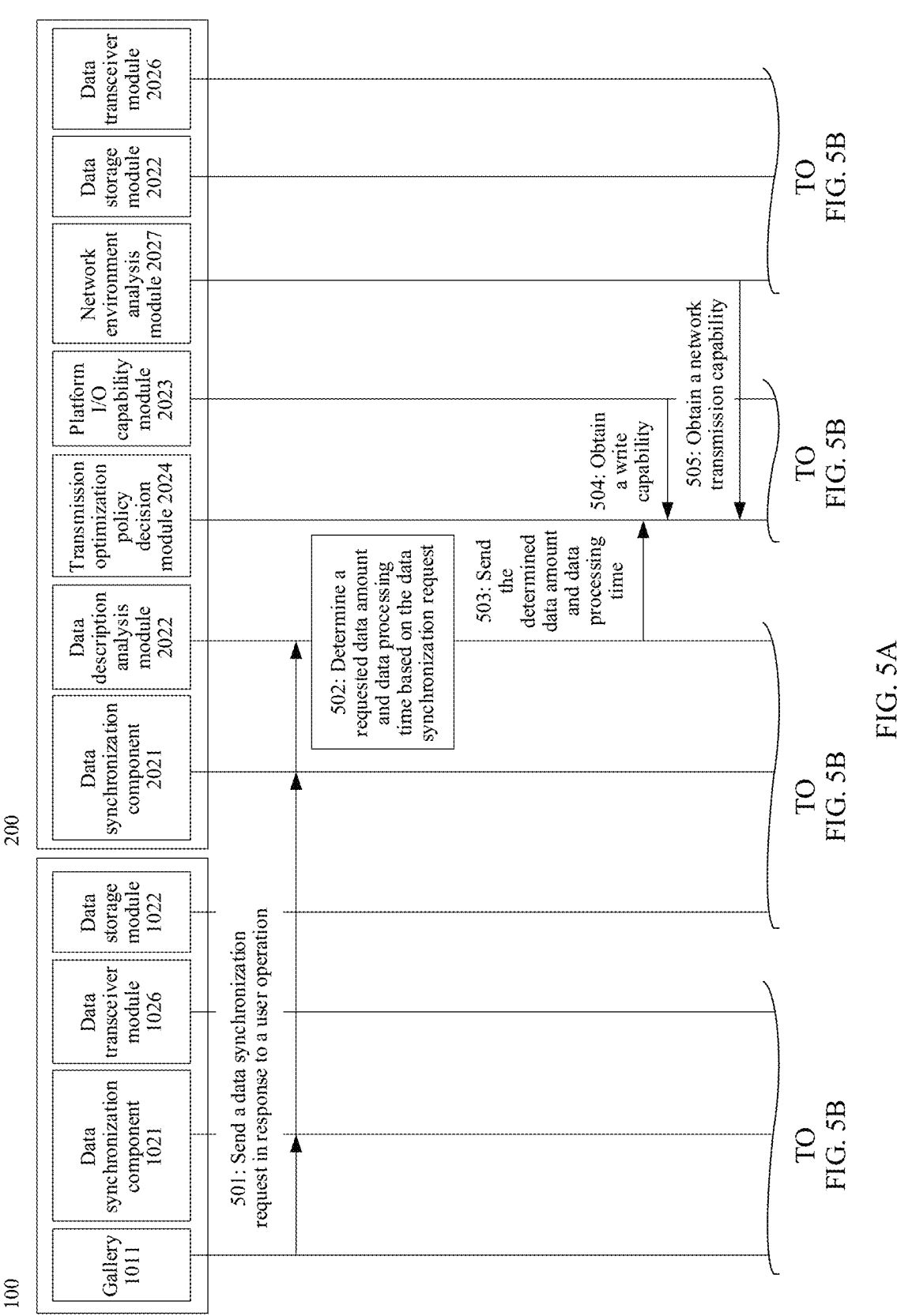
Figure 5C:
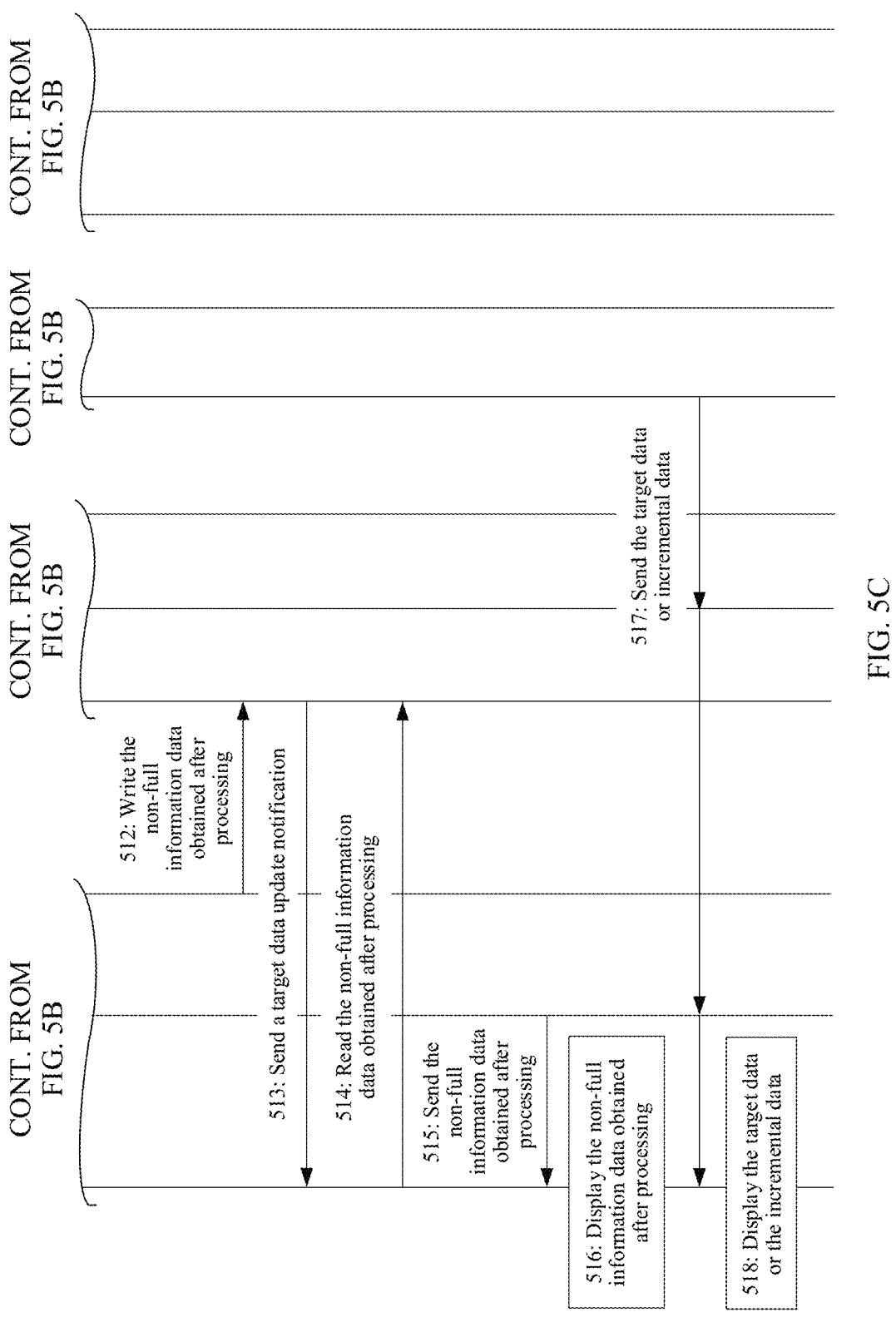

Corresponding to FIG. 3A and FIG. 3B, FIG. 5A, FIG. 5B, and FIG. 5C are a schematic flowchart of a data synchronization method according to some embodiments of this application. As shown in FIG. 5A, FIG. 5B, and FIG. 5C, the procedure includes the following steps.

501: Gallery 1011 sends, in response to an operation of a user, a data synchronization request to a data description analysis module 2022 successively through a data synchronization component 1021 and a data synchronization component 2021.

For example, as shown in FIG. 2C, the tablet 100 responds to an operation of tapping a thumbnail of the selected target picture 12-12 by the user, and then sends a request for large picture data of the selected target picture 12-12 to the mobile phone 200 in response to the operation. In some other embodiments, in some voice interaction scenarios or gesture interaction scenarios, the user may trigger, by using a preset voice instruction (for example, a "request data synchronization" voice) or a gesture instruction (for example, shaking the mobile phone 200 for five consecutive seconds), the tablet 100 to send a request for large picture data of the selected target picture 12-12 to the mobile phone 200.

502: The data description analysis module 2022 determines a requested data amount and data processing time based on the data synchronization request.

The data description analysis module 2022 is configured to classify data descriptions in the data synchronization request based on the data synchronization request. Different data descriptions correspond to different data processing complexity and time overheads, thereby obtaining a data amount of target data corresponding to the data synchronization request and a time for processing the target data.

It may be understood that the data description may be attribute information of data. For example, if the data is a picture, the data description may be a resolution of the picture. If the data is a picture and a text, the data description may be a resolution of the picture, a font of the text, or the like.

After obtaining the data amount of the target data corresponding to the data synchronization request and the time for processing the target data, the data description analysis module 2022 provides a transmission optimization policy decision module 2024 with the data amount of the target data corresponding to the data synchronization request and the time for processing the target data.

A platform I/O capability module 2023 is configured to locally store a read/write performance indicator. After a hyper terminal system is formed between the mobile phone 200 and the mobile phone 200, the platform I/O capability module 2023 and the platform I/O capability module 2023 may exchange write capability data. A write capability may include a speed at which the mobile phone 200 writes data to the mobile phone 200, and the speed may be measured in milliseconds per megabit, which is not limited herein.

503: The data description analysis module 2022 sends the determined data amount and data processing time to the transmission optimization policy decision module 2024.

504: The transmission optimization policy decision module 2024 obtains a write capability from the platform I/O capability module 2023.

The transmission optimization policy decision module 2024 obtains the write capability of the tablet 100 from the platform I/O capability module 2023.

505: The transmission optimization policy decision module 2024 obtains a network transmission capability from a network environment analysis module 2027.

506: The transmission optimization policy decision module 2024 determines a data transmission time and a data write time based on the determined data amount, the write capability, and the network transmission capability, and determines a total consumed time of the data processing time, the data transmission time, and the data write time.

It may be understood that the total consumed time T is a time consumed by the mobile phone 200 to transmit the data corresponding to the data synchronization request to the tablet 100.

The total time consumed T may be calculated by using the following formula:

$$T = T_p + T_b + T_w$$

where $T_p$ represents the data processing time, $T_b$ represents the data transmission time, and $T_w$ represents the data write time.

In some embodiments, the data write time $T_w$ may be obtained by multiplying the write capability by a target data amount. If the write capability is represented by a symbol W, and the target data amount is represented by a symbol S, the data write time $T_w$ may be obtained by using the following formula:

$$T_w = W * S$$

The write capability W may be measured in milliseconds per megabyte (ms/MB), and the target data amount S may be measured in megabytes (MB), which is not limited herein.

In some other embodiments, a relationship between data write time $T_w$, the write capability, and the target data amount is not limited to a linear relationship in the foregoing formula. In a test phase, the data write time $T_w$, the write capability, and the target data amount may be fitted based on a specific amount of test data of the data write time $T_w$, the write capability, and the target data amount, to obtain a fitting formula between the data write time $T_w$, the write capability, and the target data amount, and the fitting formula is configured in the platform I/O capability module 2023. In this way, in a case in which the write time is required, the mobile phone 200 may obtain a write time corresponding to the data synchronization request based on a data amount of the target data obtained from the data description analysis module 2022 and a write time data model of the mobile phone 200 obtained from the platform I/O capability module 2023.

In some embodiments, the data transmission time $T_p$ may be obtained by multiplying an I/O capability by the target data amount. If the write capability is represented by a symbol B, and the target data amount is represented by a symbol S, the data transmission time $T_b$ may be obtained by using the following formula:

$$T_b = B * S$$

The I/O capability B may be measured in milliseconds per megabyte (ms/MB), and the target data amount S may be measured in megabytes (MB), which is not limited herein.

In some embodiments, the I/O capability B may be obtained in the following manner: A curve is drawn based on a large amount of test data of the target data amount and the I/O capability, and fitting is performed based on the curve, to obtain a corresponding data model (formula) for the I/O capability B. FIG. 6 shows a fitting curve of the I/O capability B. The abscissa in FIG. 5A, FIG. 5B, and FIG. 5C represents the target data amount, and the ordinate represents the I/O capability B. The data model for the I/O capability may be calculated as follows:

$$B = \phi * \log(S + c) + \Delta_B$$

B represents the I/O capability, S represents the target data amount, the target data amount S may be measured in megabytes (MB), and $\phi$, c, and $\Delta_B$ are all constants, which are not limited herein.

It may be understood that, in a case in which the tablet 100 and the mobile phone 200 are networked, the data model for the I/O capability may be shared by the network environment analysis module 1027 and the network environment analysis module 2027 to obtain a data model for an I/O capability of each other. In this way, in a case in which the data transmission time needs to be calculated, the mobile phone 200 may obtain a data transmission time corresponding to the data synchronization request based on the data amount of the target data obtained from the data description analysis module 2022, and the data model for the I/O capability of the tablet 100 obtained from the network environment analysis module 2027.

507: The transmission optimization policy decision module 2024 determines whether the total consumed time is greater than a preset time threshold, and if yes, the method proceeds to 408, or if no, the method proceeds to 409.

It may be understood that the preset time threshold may be determined based on an actual situation. For example, the preset time threshold may be determined based on a basic time obtained from a human factors engineering experiment that conforms to user experience. The preset threshold may be 700 milliseconds (ms).

508: The transmission optimization policy decision module 2024 generates a data processing policy according to a principle of reducing an order of magnitude of data.

In some embodiments, if a data type of requested data corresponding to the data synchronization request is a picture, the data processing policy is that the mobile phone 200 may adjust picture data with the preset resolution to picture data with a resolution lower than the preset resolution.

509: The transmission optimization policy decision module 2024 reads the target data corresponding to the data synchronization request.

510: The transmission optimization policy decision module 2024 processes the read target data according to the generated data processing policy.

511: The transmission optimization policy decision module 2024 sends, to a data transceiver module 1026, non-full information data obtained after processing by using a data transceiver module 2026.

512: The data transceiver module 1026 writes the non-full information data obtained after processing to a data storage module 1022.

In some embodiments, if a data type of requested data corresponding to the data synchronization request is a picture, the mobile phone 200 may adjust picture data with the preset resolution to picture data with a resolution lower than the preset resolution, to adjust the target data finally sent to the tablet 100 to non-full information data. For example, as shown in FIG. 2C, the mobile phone 200 determines through calculation that an estimated time for transmitting large picture data of the target picture 12-12 corresponding to the request from the mobile phone 200 to the tablet 100 is greater than the preset time threshold. In this case, the mobile phone 200 adjusts the large picture data of the target picture 12-12 to picture data with a low resolution.

513: The data transceiver module 1026 sends a target data update notification to the data synchronization component 1021.

514: The data synchronization component 1021 reads the non-full information data obtained after processing from the data storage module 1026.

515: The data synchronization component 1021 sends the non-full information data obtained after processing to an app 101.

516: The app 101 displays the non-full information data obtained after processing.

517: The transmission optimization policy decision module 2024 sends the target data or incremental information data to the app 101 successively through the data synchronization component 2021 and the data synchronization component 1021.

518: The app 101 displays the target data or the incremental information data.

It may be understood that, in this embodiment, the target data is picture data with the preset resolution, and the tablet 100 refreshes a data display page based on the picture data with the preset resolution, and displays a picture with the preset resolution. For example, as shown in FIG. 2E, the tablet 100 refreshes the display page, and displays a large picture of the target picture 12-12.

It may be understood that, based on the foregoing solution, this application can determine different data processing policies required for cross-device synchronization of data, based on different network environments, different data amounts, and read/write and processing capabilities of different electronic devices on the premise of human factors engineering and user experience. Through construction of a dynamic data processing and transmission policy and comprehensive consideration of the foregoing factors, better collaboration of network transmission, data processing, and data writing is implemented, thereby improving user experience.

Figure 7:
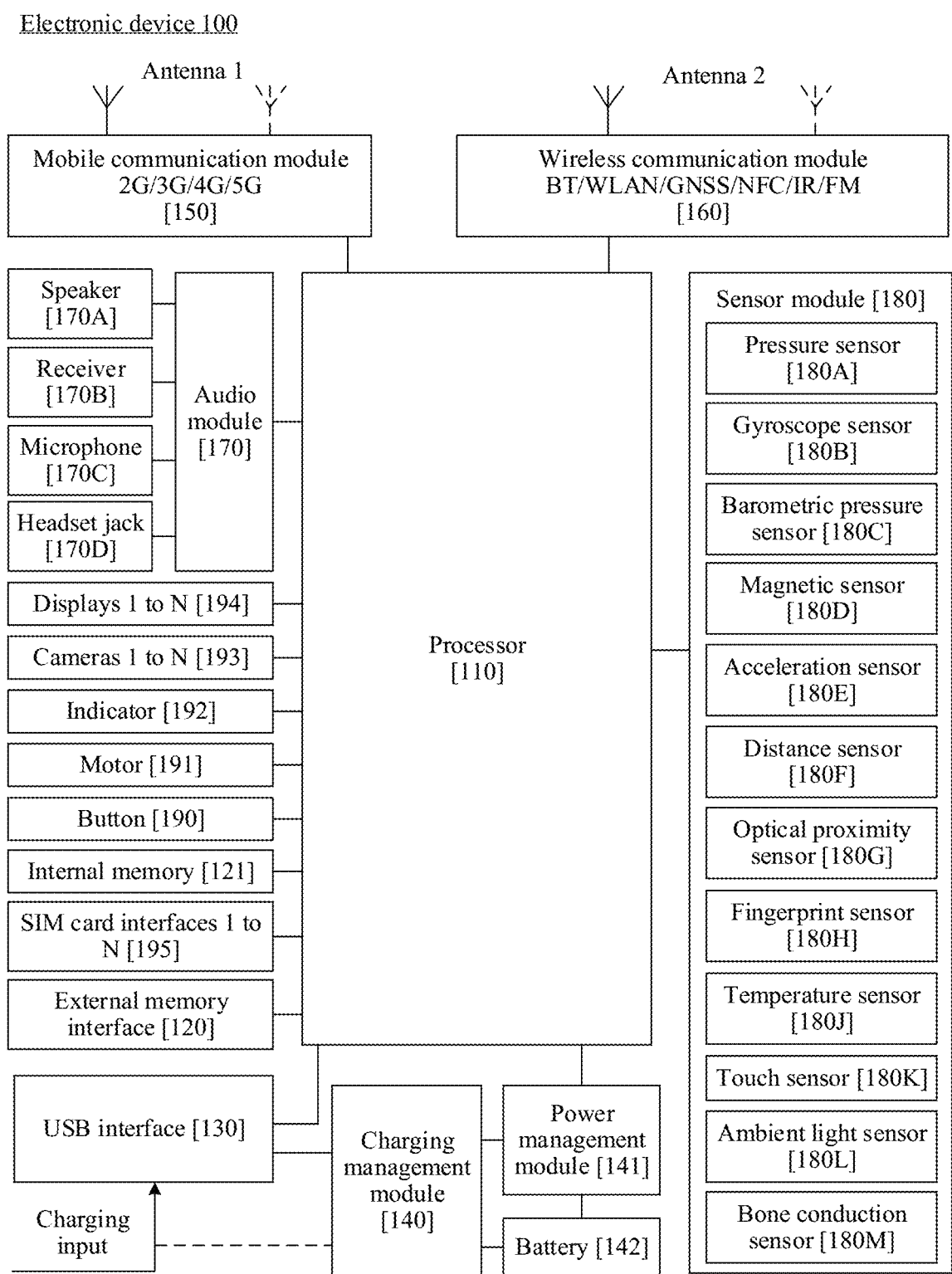
FIG. 7 is a diagram of a structure of a tablet according to an embodiment of this application.

FIG. 7 is a schematic of a structure of a tablet 100 according to some embodiments of this application. As shown in FIG. 7, the tablet 100 may include a processor 110, an external memory interface 120, an internal memory 121, a sensor module 180, a button 190, a camera 193, a display 194, and the like. The sensor module 180 may include a pressure sensor 180A, a touch sensor 180K, and the like.

It may be understood that the structure shown in this embodiment of this application does not constitute a specific limitation on the tablet 100. In some other embodiments of this application, the tablet 100 may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors. For example, the processor 110 is configured to perform the data synchronization method in embodiments of this application.

A memory may be further disposed in the processor 110, and is configured to store instructions and data. In some embodiments, the memory in the processor 110 is a cache memory. The memory may store instructions or data that have just been used or used repeatedly by the processor 110. If the processor 110 needs to use the instructions or data again, the processor 110 may directly invoke the instructions or data from the memory. This avoids repeated access, reduces a waiting time of the processor 110, and improves system efficiency.

The external memory interface 120 may be configured to connect to an external storage card, for example, a micro SD card, to extend a storage capability of the tablet 100. The external memory card communicates with the processor 110 through the external memory interface 120, to implement a data storage function.

The internal memory 121 may be configured to store computer-executable program code. The executable program code includes instructions. The processor 110 executes various functional applications and data processing of the tablet 100 by running the instructions stored in the internal memory 121. The internal memory 121 may include a program storage area and a data storage area. The program storage area may store an operating system, an application program required by at least one function (for example, a video shooting function or a video playback function), and the like.

In addition, the internal memory 121 may include a high-speed random access memory, and may further include a non-volatile memory, for example, at least one magnetic disk storage device, a flash memory device, and a universal flash storage (UFS).

For example, the internal memory may store a computer program for implementing the data synchronization method provided in embodiments of this application.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The tablet 100 determines pressure intensity based on a change of the capacitance. When a touch operation is performed on the display 194, the tablet 100 detects intensity of the touch operation by using the pressure sensor 180A. The tablet 100 may also calculate a touch position based on a detection signal of the pressure sensor 180A.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of a touch event. A visual output related to the touch operation may be provided on the display 194. In some other embodiments, the touch sensor 180K may alternatively be disposed on a surface of the tablet 100 at a position different from that of the display 194.

For example, an electronic device may detect, by using the pressure sensor and the touch sensor, an operation performed by a user on the display, for example, an operation of tapping a control by the user.

The button 190 includes a power button, a volume button, and the like. The button 190 may be a mechanical button, or may be a touch button. The tablet 100 may receive a button input, and generate a button signal input related to user setting and function control of the tablet 100.

The tablet 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. In some embodiments, the tablet 100 may include one or M displays 194, where M is a positive integer greater than 1.

The camera 193 is configured to capture a static image or a video. In some embodiments, the tablet 100 may include one or P cameras 193, where P is a positive integer greater than 1.

A specific structure of an execution body of the data synchronization method is not particularly limited in embodiments of this application, provided that code of the data synchronization method recorded in embodiments of this application can be run to perform communication according to the data synchronization method provided in embodiments of this application. For example, the execution body of the data synchronization method provided in embodiments of this application may be a functional module in the tablet 100 that can invoke and execute a program, or may be a processing apparatus, for example, a chip, applied to the tablet 100.

An embodiment of this application further provides a computer-readable storage medium. The computer-readable storage medium includes computer instructions. When the computer instructions are run on the foregoing electronic device, the electronic device is enabled to perform functions or steps performed by the tablet 100 (for example, components in the tablet 100) or the mobile phone 200 (for example, components in the mobile phone 200) in the foregoing method embodiments.

An embodiment of this application further provides a computer program product. When the computer program product runs on a computer, the computer is enabled to perform functions or steps performed by the mobile phone 20 (for example, components in the mobile phone 200) in the foregoing method embodiments.

Embodiments of a mechanism disclosed in this application may be implemented in hardware, software, firmware, or a combination of these implementations. Embodiments of this application may be implemented as a computer program or program code executed in a programmable system. The programmable system includes at least one processor, a storage system (including a volatile memory, a non-volatile memory, and/or a storage element), at least one input device, and at least one output device.

The program code may be configured to input instructions, to perform functions described in this application and generate output information. The output information may be applied to one or more output devices in a known manner. For a purpose of this application, a processing system includes any system that has a processor such as a digital signal processor (DSP), a microcontroller, an application-specific integrated circuit (ASIC), or a microprocessor.

The program code may be implemented in a high-level procedural language or an object-oriented programming language, to communicate with the processing system. The program code may alternatively be implemented by using an assembly language or a machine language when needed. Actually, the mechanisms described in this application are not limited to a scope of any particular programming language. In any case, the language may be a compiled language or an interpretive language.

In some cases, the disclosed embodiments may be implemented by hardware, firmware, software, or any combination thereof. The disclosed embodiments may be alternatively implemented by using instructions carried by or stored on one or more temporary or non-temporary machine-readable (for example, computer-readable) storage media, and the instructions may be read and executed by one or more processors. For example, the instructions may be distributed through a network or another computer-readable medium. Therefore, the machine-readable medium may include any mechanism for storing or transmitting information in a machine-readable (for example, computer-readable) form. The machine-readable medium includes but is not limited to a floppy disk, a compact disc, an optical disc, a read-only memory (CD-ROMs), a magneto-optical disc, a read-only memory (ROM), a random access memory (RAM), an erasable programmable read-only memory (EPROM), an electrically erasable programmable read-only memory (EEPROM), a magnetic card, an optical card, a flash memory, or a tangible machine-readable memory configured to transmit information (for example, a carrier, an infrared signal, or a digital signal) by using a propagating signal in an electrical, optical, acoustic, or another form over the internet. Therefore, the machine-readable medium includes any type of machine-readable medium that is suitable for storing or transmitting electronic instructions or information in a machine-readable (for example, computer-readable) form.

In the accompanying drawings, some structural or method features may be shown in a particular arrangement and/or order. However, it should be understood that such a particular arrangement and/or order may not be needed. In some embodiments, these features may be arranged in a manner and/or order different from those/that shown in the descriptive accompanying drawings. In addition, inclusion of the structural or method features in a particular figure does not imply that such features are needed in all embodiments, and in some embodiments, these features may not be included or may be combined with other features.

It should be noted that all units/modules mentioned in the device embodiments of this application are logical units/ modules. Physically, one logical unit/module may be one physical unit/module, may be a part of one physical unit/module, or may be implemented by using a combination of a plurality of physical units/modules. Physical implementations of these logical units/modules are not the most important, and a combination of functions implemented by these logical units/modules is a key to resolving technical issues proposed in this application. In addition, to highlight an innovative part of this application, a unit/module that is not closely related to resolving the technical issues proposed in this application is not introduced in the foregoing device embodiments of this application. This does not mean that there are no other units/modules in the foregoing device embodiments.

It should be noted that in the examples and the specification of this patent, relational terms such as first and second are used only to differentiate an entity or operation from another entity or operation, and do not require or imply that any actual relationship or sequence exists between these entities or operations. Moreover, a term "include", "comprise", or any other variants thereof are intended to encompass a non-exclusive inclusion, so that a process, a method, an article, or a device that includes a series of elements not only includes those elements, but also includes other elements not explicitly listed, or further includes elements inherent to such a process, method, article, or device. Without further limitations, an element limited by "include a/an" does not exclude other same elements existing in the process, the method, the article, or the device that includes the element.

Although this application has been illustrated and described with reference to some preferred embodiments of this application, a person of ordinary skill in the art should understand that various changes may be made to this application in form and detail without departing from the spirit and scope of this application.

The invention claimed is:

1. A method, comprising:

receiving, by a first electronic device, a data synchronization request sent by a second electronic device;

determining, by the first electronic device in response to the data synchronization request, a first time required for sending first data requested by the data synchronization request to the second electronic device;

adjusting, by the first electronic device, the first data to obtain second data in response to the first time being greater than a preset time threshold, wherein a data amount of the second data is less than a data amount of the first data; and sending, by the first electronic device, the second data to the second electronic device, wherein a second time required by the first electronic device to send the second data to the second electronic device is less than the preset time threshold.

2. The method according to claim 1, further comprising:

sending, by the first electronic device after sending the second data to the second electronic device, the first data to the second electronic device.

3. The method according to claim 2, wherein adjusting, by the first electronic device, the first data corresponding to the data synchronization request to obtain the second data comprises:

adjusting, by the first electronic device in response to the first data being a picture or a video with a preset resolution, the preset resolution or a size of the first data, to obtain the second data.

4. The method according to claim 1, further comprising:

sending, by the first electronic device after sending the second data to the second electronic device, third data to the second electronic device, wherein the first data is full data, and the third data is incremental data.

5. The method according to claim 4, wherein a type of the third data is different from a type of the second data.

6. The method according to claim 1, wherein the first time is a time T, and is calculated according to the following formula:

$$T=T_p+T_b+T_w, \text{ wherein}$$

$T_p$ represents a data processing time for the first electronic device to process the first data, $T_b$ represents a data transmission time required by the first electronic device to send the first data to the second electronic device, and $T_w$ represents a write time for the second electronic device to write the first data to the second electronic device.

7. A method, comprising:

sending, by a second electronic device, a data synchronization request to a first electronic device, wherein data requested by the data synchronization request is first data; and receiving, by the second electronic device, second data sent by the first electronic device, wherein a data amount of the second data is less than a data amount of the first data, a time required by the first electronic device to send the first data to the second electronic device is a first time, and a second time required by the first electronic device to send the second data to the second electronic device is less than the first time.

8. The method according to claim 7, further comprising:

receiving, by the second electronic device, the first data sent by the first electronic device, and displaying, by the second electronic device, the first data.

9. The method according to claim 8, wherein the first data is a picture or a video with a preset resolution, and the second data is a picture or a video with a resolution or size lower than the preset resolution or size.

10. The method according to claim 7, further comprising:

receiving, by the second electronic device after receiving the second data sent by the first electronic device, third data sent by the first electronic device, and displaying the third data, wherein the first data is full data, and the third data is incremental data.

11. The method according to claim 10, wherein a type of the third data is different from a type of the second data.

12. The method according to claim 7, wherein the first time is a time T, and is calculated according to the following formula:

$$T=T_p+T_b+T_w, \text{ wherein}$$

$T_p$ represents a data processing time for the first electronic device to process the first data, $T_b$ represents a data transmission time required by the first electronic device to send the first data to the second electronic device, and $T_w$ represents a write time for the second electronic device to write the first data to the second electronic device.

13. An electronic device, comprising:

a non-transitory storage medium storing instructions; and one or more processors configured to execute the instructions, wherein the instructions when executed to cause the electronic device to perform:

receiving a data synchronization request sent by a second electronic device;

determining in response to the data synchronization request, a first time required for sending first data requested by the data synchronization request to the second electronic device;

adjusting the first data to obtain second data in response to the first time being greater than a preset time threshold, wherein a data amount of the second data is less than a data amount of the first data; and sending the second data to the second electronic device, wherein a second time required by the electronic device to send the second data to the second electronic device is less than the preset time threshold.

14. The electronic device according to claim 13, wherein the instructions, when executed, further cause the electronic device to perform:

sending, after sending the second data to the second electronic device, the first data to the second electronic device.

15. The electronic device according to claim 14, wherein the instructions, when executed, further cause the electronic device to perform:

adjusting, in response to the first data being a picture or a video with a preset resolution, the preset resolution or a size of the first data, to obtain the second data.

16. The electronic device according to claim 13, wherein the instructions, when executed, further cause the electronic device to perform:

sending third data to the second electronic device, wherein the first data is full data, and the third data is incremental data.

17. The electronic device according to claim 16, wherein a type of the third data is different from a type of the second data.

18. The electronic device according to claim 13, wherein the first time is a time T, and is calculated according to the following formula:

$$T = T_p + T_b + T_w, \text{ wherein}$$

$T_p$ represents a data processing time for the electronic device to process the first data, $T_b$ represents a data transmission time required by the electronic device to send the first data to the second electronic device, and $T_w$ represents a write time for the second electronic device to write the first data to the second electronic device.

19. The electronic device according to claim 13, wherein the first data comprises an address book information entry, wherein the address book information entry comprises contact information and a contact profile picture, and the second data comprises the contact information.

20. The electronic device according to claim 19, wherein the instructions, when executed, further cause the electronic device to perform:

transmitting a default profile picture of the electronic device when the contact information in the address book information entry does not have a contact profile picture corresponding to the contact information.

* * * * *